(12) United States Patent
Hancock et al.

(10) Patent No.: US 6,295,502 B1
(45) Date of Patent: *Sep. 25, 2001

(54) METHOD OF IDENTIFYING GEOGRAPHICAL LOCATION USING HIERARCHICAL GRID ADDRESS THAT INCLUDES A PREDEFINED ALPHA CODE

(76) Inventors: S. Lee Hancock, 4 Hampshire Ct., Newport Beach, CA (US) 92660; Peter H. Dana, 1101 Walnut St., Georgetown, TX (US) 78626; Scott D. Morrison, 24111 Castilla La., Mission Viejo, CA (US) 92691

(*) Notice: Subject to any disclaimer, the term of this patent is extended or adjusted under 35 U.S.C. 154(b) by 0 days.

This patent is subject to a terminal disclaimer.

(21) Appl. No.: 09/645,814

(22) Filed: Aug. 24, 2000

Related U.S. Application Data

(63) Continuation of application No. 09/257,462, filed on Feb. 25, 1999, now Pat. No. 6,202,023, which is a continuation-in-part of application No. 09/188,153, filed on Nov. 4, 1998, now Pat. No. 6,047,236, which is a continuation of application No. 08/701,586, filed on Aug. 22, 1996, now Pat. No. 5,839,088.

(51) Int. Cl.[7] .............................. G01C 21/20; G01S 5/02
(52) U.S. Cl. ........................................... 701/201; 701/208
(58) Field of Search ..................................... 701/201, 208, 701/300; 340/988

(56) References Cited

U.S. PATENT DOCUMENTS

| | | |
|---|---|---|
| 4,677,561 | 6/1987 | Akam et al. . |
| 4,974,170 | 11/1990 | Bouve et al. . |
| 5,289,195 | 2/1994 | Inoue . |
| 5,296,861 | 3/1994 | Knight . |
| 5,311,434 | 5/1994 | Tamai . |
| 5,323,322 | 6/1994 | Mueller et al. . |
| 5,345,244 | 9/1994 | Gildea et al. . |
| 5,355,140 | 10/1994 | Slavin et al. . |
| 5,359,332 | 10/1994 | Allison et al. . |
| 5,396,254 | 3/1995 | Toshiyuki . |
| 5,406,491 | 4/1995 | Lima . |
| 5,418,538 | 5/1995 | Lau . |
| 5,422,814 | 6/1995 | Sprague et al. . |

(List continued on next page.)

FOREIGN PATENT DOCUMENTS

| | | |
|---|---|---|
| WO 97/07467 | 2/1997 | (WO) . |
| WO 98/59506 | 12/1998 | (WO) . |

*Primary Examiner*—Michael J. Zanelli
(74) *Attorney, Agent, or Firm*—Lyon & Lyon LLP

(57) ABSTRACT

A system and method for automatically providing services over a computer network, such as the Internet, for users in a mobile environment based on their geographic location. A client computer system is equipped with a local storage device, a wireless transceiver, an input device, in output device and an automatic location identifying (ALI) device. An application program is installed on the client computer system that prompts the user to input information. The application program builds a data packet comprising location information and user information and stores the data packet on the local client storage device. The client computer system connects with a server coupled to a computer network, such as the Internet. Upon connection, the client automatically transmits the electronic data packet to the server. The primary server maintains a database that contains a list of enhanced services. The information in the data packet is used to formulate a database query. The result of the database query is an address of a particular enhanced server that matches the client's request. A specific universal resource locator (URL) that contains the address of the enhanced server is transmitted to the client. The client computer system launches a web browser and connects to the enhanced server. Upon connection relevant data customized for the client's location is automatically displayed without additional input from the user.

29 Claims, 27 Drawing Sheets

U.S. PATENT DOCUMENTS

| | | |
|---|---|---|
| 5,424,951 | 6/1995 | Nobe et al. . |
| 5,436,632 | 7/1995 | Sheynblat . |
| 5,450,344 | 9/1995 | Woo et al. . |
| 5,452,217 | 9/1995 | Kishi et al. . |
| 5,471,392 | 11/1995 | Yamashita . |
| 5,477,458 | 12/1995 | Loomis . |
| 5,596,500 | 1/1997 | Sprague et al. . |
| 5,839,088 | 11/1998 | Hancock . |
| 6,006,160 * | 12/1999 | Tamaki et al. ............... 701/208 |

* cited by examiner

```
AK,ANC,ANCHORAGE,149W54,61N13
AK,FBK,FAIRBANKS,147W43,64N51
AK,JUN,JUNEAU,134W24,58N18
AL,ANN,ANNISTON,085W50,33N39
AL,BES,BESSEMER,086W58,33N24
AL,BIR,BIRMINGHAM,086W48,33N31
AL,DEC,DECATUR,086W59,34N36
AL,DOT,DOTHAN,085W24,31N13
AL,FLO,FLORENCE,087W41,34N48
AL,GAD,GADSDEN,086W01,34N01
AL,HUN,HUNTSVILLE,086W35,34N44
AL,MOB,MOBILE,088W03,30N41
AL,MON,MONTGOMERY,086W19,32N23
AL,PHE,PHENIX CITY,085W00,32N28
AL,PRI,PRICHARD,088W05,30N44
AL,SEL,SELMA,087W01,32N25
AL,TUS,TUSCALOOSA,087W34,33N12
AR,EDO,EL DORADO,092W40,33N12
AR,FAY,FAYETTEVILLE,096W10,36N04
AR,FTS,FORT SMITH,094W25,35N23
AR,HOS,HOT SPRINGS NAT PA,093W03,34N31
AR,JON,JONESBORO,090W42,35N50
AR,LRK,LITTLE ROCK,092W17,34N45
AR,NLR,NORTH LITTLE ROCK,092W16,34N46
AR,PIB,PINE BLUFF,092W01,34N13
AR,WME,WEST MEMPHIS,090W11,35N09
AZ,FLA,FLAGSTAFF,111W39,35N12
AZ,GCN,GRAND CANYON,112W8,36N59
AZ,GLD,GLENDALE,112W11,33N32
AZ,MES,MESA,111W50,33N25
AZ,PHO,PHOENIX,112W04,33N27
AZ,SCO,SCOTTSDALE,111W56,33N29
AZ,TEM,TEMPE,111W56,33N25
AZ,TUC,TUCSON,110W58,32N13
AZ,YMA,YUMA,114W37,32N43
CA,ALA,ALAMEDA,122W15,37N46
CA,ALH,ALHAMBRA,118W06,34N08
CA,ALT,ALTADENA,118W08,34N11
CA,ANA,ANAHEIM,117W55,33N50
CA,ANT,ANTIOCH,121W48,38N01
CA,ARA,ACADIA,118W12,34N08
CA,ARD,ARDEN,121W23,38N36
CA,ARE,ARCADE,118W01,34N08
CA,AZU,AZUSA,117W52,34N08
CA,BAK,BAKERSFIELD,119W01,35N23
CA,BAP,BALDWIN PARK,117W58,34N04
CA,BBK,BURBANK,118W19,34N11
CA,BEF,BELLFLOWER,118W09,33N53
CA,BEG,BELL GARDENS,118W10,33N58
CA,BEL,BELL,118W11,33N59
CA,BEV,BEVERLY HILLS,118W25,34N04
```

*Fig. 8A*

```
CA,BMT,BELMONT,122W16,37N31
CA,BRK,BERKELEY,122W16,37N52
CA,BUP,BUENA PARK,117W60,32N52
CA,BUR,BURLINGAME,112W21,37N35
CA,CAM,CAMPBELL,121W57,37N17
CA,CAR,CARMICHAEL,121W19,38N38
CA,CAR,CARSON,118W17,33N48
CA,CAV,CASTRO VALLEY,122W04,37N42
CA,CHI,CHINO,117W41,34N01
CA,CHV,CHULA VISTA,117W05,32N39
CA,CIH,CITRUS HEIGHTS,121W17,38N42
CA,CLA,CLAREMONT,117W43,34N06
CA,COL,COLTON,117W19,34N04
CA,CMP,COMPTON,118W13,33N54
CA,COM,COSTA MESA,117W55,33N38
CA,CON,CONCORD,122W02,37N59
CA,COV,COVINA,117W52,34N05
CA,CRN,CORONA,117W34,33N53
CA,CRO,CORONADO,117W10,32N41
CA,CUC,CULVER CITY,118W25,34N01
CA,CYP,CYPRESS,118W02,33N50
CA,DAC,DALY CITY,122W28,37N42
CA,DAV,DAVIS,121W44,38N32
CA,DOW,DOWNEY,118W08,33N56
CA,ECA,EL CAJON,116W58,32N48
CA,ECE,EL CERRITO,122W19,37N55
CA,ELA,EAST LOS ANGELES,118W09,34N01
CA,EMT,EL MONTE,122W00,37N59
CA,ESC,ESCONDIDO,117W05,33N07
CA,EUR,EUREKA,124W09,40N47
CA,FAI,FAIRFIELD,122W03,38N15
CA,FLO,FLORENCE,118W15,33N58
CA,FON,FONTANA,117W26,34N06
CA,FOV,FOUNTAIN VALLEY,117W58,33N42
CA,FRE,FREMONT,121W57,37N32
CA,FRS,FRESNO,119W47,36N44
CA,FUL,FULLERTON,117W56,33N53
CA,GAG,GARDEN GROVE,117W55,33N47
CA,GAR,GARDENA,118W1818,33N53
CA,GLD,GLENDALE,118W15,34N09
CA,GLE,GLENDORA,117W52,34N08
CA,HAH,HACIENDA HEIGHTS,117W58,33N58
CA,HAW,HAWTHORNE,118W21,33N55
CA,HAY,HAYWARD,122W05,37N40
CA,HIC,HILLCREST CENTER,118W57,35N23
CA,HOL,HOLLYWOOD,118W21,34N06
CA,HUB,HUNTINGTON BEACH,118W05,33N40
CA,HUP,HUNTINGTON PARK,118W14,33N59
CA,IMB,IMPERIAL BEACH,117W08,32N35
CA,ING,INGLEWOOD,118W21,33N58
CA,LA_,LOS ANGELES,118W15,34N04
```

*Fig. 8B*

AK,ALASKA
AL,ALABAMA
AR,ARKANSAS
AZ,ARIZONA
CA,CALIFORNIA
CO,COLORADO
CT,CONNECTICUT
DC,DISTRICT OF COLUMBIA
DE,DELAWARE
FL,FLORIDA
GA,GEORGIA
HI,HAWAII
IA,IOWA
ID,IDAHO
IL,ILLINOIS
IN,INDIANA
KS,KANSAS
KY,KENTUCKY
LA,LOUISIANA
MA,MASSACHUSETTS
MD,MARYLAND
ME,MAINE
MI,MICHIGAN
MN,MINNESOTA
MO,MISSOURI
MS,MISSISSIPPI
MT,MONTANA
NC,NORTH CAROLINA
ND,NORTH DAKOTA
NE,NEBRASKA
NH,NEW HAMPSHIRE
NJ,NEW JERSEY
NM,NEW MEXICO
NV,NEVADA
NY,NEW YORK
OH,OHIO
OK,OKLAHOMA
OR,OREGON
PA,PENNSYLVANIA
RI,RHODE ISLAND
SC,SOUTH CAROLINA
SD,SOUTH DAKOTA
TN,TENNESSEE
TX,TEXAS
UT,UTAH
VA,VIRGINIA
VT,VERMONT
WA,WASHINGTON
WI,WISCONSIN
WV,WEST VIRGINIA
WY,WYOMING

*Fig. 9*

```
US.CA.NWB.MAC2,117W52.360,33N39.549,MCDONALDS #2
US.CA.NWB.BK2,117W52.425,33N39.647,BURGER KING #2
US.CA.NWB.ARCO,117W52.459,33N39.681,ARCO
US.CA.NWB.DLTC2,117W52.513,33N39.679,DEL TACO #2
US.CA.NWB.CHVRN,117W52.557,33N39.701,CHEVRON
US.CA.NWB.JACK1,117W54.800,33N37.895,JACK-IN-THE-BOX #1
US.CA.NWB.MAC1,117W54.837,33N36.987,MCDONALDS #1
US.CA.NWB.TACO,117W55.280,33N38.278,TACO BELL
US.CA.NWB.DLTC1,117W55.354,33N38.204,DEL TACO #1
US.CA.NWB.MAC3,117W52.360,33N39.549,MCDONALDS #3
US.CA.NWB.BK1,117W52.425,33N39.647,BURGER KING #1
US.CA.NWB.ARCO,117W52.459,33N39.681,ARCO #1
US.CA.NWB.DLTC3,117W52.513,33N39.679,DEL TACO #3
US.CA.NWB.CHVRN1,117W52.557,33N39.701,CHEVRON #2
US.CA.NWB.JACK2,117W54.800,33N37.895,JACK-IN-THE-BOX #2
US.CA.NWB.MAC4,117W54.837,33N36.987,MCDONALDS #4
US.CA.NWB.TACO1,117W55.280,33N38.278,TACO BELL #1
US.CA.NWB.DLTC4,117W55.354,33N38.204,DEL TACO #4
US.CA.NWB.MAC5,117W52.360,33N39.549,MCDONALDS #5
US.CA.NWB.BK3,117W52.425,33N39.647,BURGER KING #3
US.CA.NWB.ARCO2,117W53.129,33N40.871,ARCO #2
US.CA.NWB.DLTC5,117W52.625,33N39.811,DEL TACO #5
US.CA.NWB.CHVRN3,117W52.247,33N39.642,CHEVRON #3
US.CA.NWB.JACK3,117W53.74,33N38.25,JACK-IN-THE-BOX #3
US.CA.NWB.MAC6,17W53.157,33N37.1,MCDONALDS #6
US.CA.NWB.TACO2,117W54.872,33N38.657,TACO BELL #2
US.CA.NWB.DLTC6,117W55.144,33N39.975,DEL TACO #6
US.CA.NWB.MAC7,117W52.360,33N39.549,MCDONALDS #7
US.CA.NWB.BK4,117W52.425,33N39.647,BURGER KING #4
US.CA.NWB.ARCO3,117W51.824,33N39.47,ARCO #3
US.CA.NWB.DLTC7,117W52.851,33N39.487,DEL TACO #7
US.CA.NWB.CHVRN4,117W52.557,33N39.701,CHEVRON #4
US.CA.NWB.JACK4,117W54.800,33N37.895,JACK-IN-THE-BOX #4
US.CA.NWB.MAC8,117W54.837,33N36.987,MCDONALDS #8
US.CA.NWB.TACO3,117W55.28,33N38.278,TACO BELL #3
US.CA.NWB.DLTC8,117W55.354,33N38.204,DEL TACO #8

US.CA.NWB.TEXCO,117W52.360,33N39.549,TEXACO
US.CA.NWB.GULF,117W52.425,33N39.647,GULF OIL
US.CA.NWB.ARBY,117W52.459,33N39.681,ARBY'S
US.CA.NWB.DENNY,117W52.513,33N39.679,DENNY'S
US.CA.NWB.PZHUT,117W52.557,33N39.701,PIZZA HUT
US.CA.NWB.PZINN,117W54.800,33N37.895,PIZZA INN
US.CA.NWB.PENNY,117W54.837,33N36.987,J.C. PENNY'S
US.CA.NWB.KFC1,117W55.280,33N38.278,KENTUCKY FRIED CHICKEN
US.CA.NWB.PZAPZA,117W55.354,33N38.204,LIL' CAESAERS
US.CA.NWB.SUB,117W52.360,33N39.549,SUBWAY
US.CA.NWB.WNDY,117W52.425,33N39.647,WENDY'S
US.CA.NWB.WELLS,117W52.459,33N39.681,WELL'S FARGO
```

*Fig. 10A*

```
US.CA.NWB.STAR,117W52.513,33N39.679,DEL STAR ATM
US.CA.NWB.MAIL,117W52.557,33N39.701,MAILBOX
US.CA.NWB.GMC,117W54.800,33N37.895,GENERAL MOTORS DEALER
US.CA.NWB.FORD,117W52.837,33N36.987,FORD DEALER
US.CA.NWB.MBZ,117W55.280,33N38.278,MERCEDES BENZ DEALER
US.CA.NWB.LEXUS,117W55.354,33N38.204,LEXUS DEALER
US.CA.NWB.S711,117W52.360,33N39.549,7-11
US.CA.NWB.CIRK,117W52.425,33N39.647,CIRCLE K STORE
US.CA.NWB.BOFA,117W52.459,33N39.681,BANK OF AMERICA
US.CA.NWB.ANW,117W52.513,33N39.679,A AND W RESTAURANT

US.CA.SAN.MAC2,117W52.360,33N49.549,MCDONALDS #2
US.CA.SAN.BK2,117W52.425,33N49.647,BURGER KING #2
US.CA.SAN.ARCO,117W52.459,33N49.681,ARCO
US.CA.SAN.DLTC2,117W52.513,33N49.679,DEL TACO #2
US.CA.SAN.CHVRN,117W52.557,33N49.701,CHEVRON
US.CA.SAN.JACK1,117W54.800,33N47.895,JACK-IN-THE-BOX #1
US.CA.SAN.MAC1,117W54.837,33N46.987,MCDONALDS #1
US.CA.SAN.TACO,117W55.280,33N48.278,TACO BELL
US.CA.SAN.DLTC1,117W55.280,33N48.204,DEL TACO #1
US.CA.SAN.MAC3,117W52.360,33N49.549,MCDONALDS #3
US.CA.SAN.BK1,117W52.425,33N49.647,BURGER KING #1
US.CA.SAN.ARCO1,117W52.459,33N49.681,ARCO #1
US.CA.SAN.DLTC3,117W52.513,33N49.679,DEL TACO #3
US.CA.SAN.CHVRN1,117W52.557,33N49.701,CHEVRON #2
US.CA.SAN.JACK2,117W54.800,33N47.895,JACK-IN-THE-BOX #2
US.CA.SAN.MAC4,117W54.837,33N46.987,MCDONALDS #4
US.CA.SAN.TACO1,117W55.280,33N48.278,TACO BELL #1
US.CA.SAN.DLTC4,117W55.354,33N48.204,DEL TACO #4
US.CA.SAN.MAC5,117W52.360,33N49.549,MCDONALDS #5
US.CA.SAN.BK3,117W52.425,33N49.647,BURGER KING #3
US.CA.SAN.ARCO2,117W52.459,33N49.681,ARCO #2
US.CA.SAN.DLTC5,117W52.513,33N49.679,DEL TACO #5
US.CA.SAN.CHVRN3,117W52.557,33N49.701,CHEVRON #3
US.CA.SAN.JACK3,117W54.800,33N47.895,JACK-IN-THE-BOX #3
US.CA.SAN.MAC6,117W54.837,33N46.987,MCDONALDS #6
US.CA.SAN.TACO2,117W55.280,33N48.278,TACO BELL #2
US.CA.SAN.DLTC6,117W55.354,33N48.204,DEL TACO #6
US.CA.SAN.MAC7,117W52.360,33N49.549,MCDONALDS #7
US.CA.SAN.BK4,117W52.425,33N49.647,BURGER KING #4
US.CA.SAN.ARCO3,117W52.459,33N49.681,ARCO #3
US.CA.SAN.DLTC7,117W52.513,33N49.647,DEL TACO #7
US.CA.SAN.CHVRN4,117W52.557,33N49.701,CHEVRON #4
US.CA.SAN.JACK4,117W54.800,33N47.895,JACK-IN-THE-BOX #4
US.CA.SAN.MAC8,117W54.837,33N46.987,MCDONALDS #8
US.CA.SAN.TACO3,117W55.280,33N48.278,TACO BELL #3
US.CA.SAN.DLTC8,117W55.354,33N48.204,DEL TACO #8

US.CA.YSM.WWNA,119W39.23,37N32.20,WAWONA LODGE
US.CA.YSM.TLME,119W21.54,37N52.32,TUOLUMNE MEADOWS
```

*Fig. 10B*

```
US.CA.YSM.HFDM,119W31.56,37N44.84,HALF DOME
US.CA.YSM.HCHY,119W47.37,37N56.78,HETCH HETCY RESERVOIR
US.CA.YSM.BDGP,119W39.72,37N40.25,BADGER PASS
US.CA.YSM.MRPG,119W36.13,37N30.77,MARIPOSA GROVE
US.CA.YSM.SENT,119W37.96,37N30.12,SOUTH ENTRANCE
US.CA.YSM.NENT,119W52.54,37N48.69,NORTH ENTRANCE
US.CA.YSM.WENT,119W46.21,37N40.64,WEST ENTRANCE
US.CA.YSM.EENT,119W15.57,37N54.38,EAST ENTRANCE
US.CA.YSM.WWLF,119W38.73,37N52.35,WHITE WOLF
US.CA.YSM.GCRP,119W34.30,37N43.67,GLACIER POINT
US.CA.YSM.YSMF,119W37.12,37N45.34,YOSEMITE FALLS

US.CA.YSM.GGG1,119W39.23,37N32.20,WAWONA LODGE
US.CA.YSM.GGG2,119W21.54,37N52.32,TUOLUMNE MEADOWS
US.CA.YSM.GGG3,119W31.56,37N44.84,HALF DOME
US.CA.YSM.GGG4,119W47.37,37N56.78,HETCH HETCHY RESERVOIR
US.CA.YSM.GGG5,119W39.72,37N40.25,BADGER PASS
US.CA.YSM.GGG6,119W36.13,37N30.77,MARIPOSA GROVE
US.CA.YSM.GGG7,119W37.96,37N30.12,SOUTH ENTRANCE
US.CA.YSM.GGG8,119W52.54,37N48.69,NORTH ENTRANCE
US.CA.YSM.GGG9,119W46.21,37N40.64,WEST ENTRANCE
US.CA.YSM.GGG10,119W15.57,37N54.38,EAST ENTRANCE
US.CA.YSM.GGG11,119W38.73,37N52.35,WHITE WOLF
US.CA.YSM.GGG12,119W34.30,37N43.67,GLACIER POINT
US.CA.YSM.GGG13,119W37.12,37N45.34,YOSEMITE FALLS

US.CA.YSM.G1,119W39.23,37N32.20,WAWONA LODGE
US.CA.YSM.G2,119W21.54,37N52.32,TUOLUMNE MEADOWS
US.CA.YSM.G3,119W31.56,37N44.84,HALF DOME
US.CA.YSM.G4,119W47.37,37N56.78,HETCH HETCHY RESERVOIR
US.CA.YSM.G5,119W39.72,37N40.25,BADGER PASS
US.CA.YSM.G6,119W36.13,37N30.77,MARIPOSA GROVE
US.CA.YSM.G7,119W37.96,37N30.12,SOUTH ENTRANCE
US.CA.YSM.G8,119W52.54,37N48.69,NORTH ENTRANCE
US.CA.YSM.G9,119W46.21,37N40.64,WEST ENTRANCE
US.CA.YSM.G10,119W15.57,37N54.38,EAST ENTRANCE
US.CA.YSM.G11,119W38.73,37N52.35,WHITE WOLF
US.CA.YSM.G12,119W34.30,37N43.67,GLACIER POINT
US.CA.YSM.G13,119W37.12,37N45.34,YOSEMITE FALLS

US.CA.YSB.HFDM,119W31.56,37N44.84,HALF DOME
US.CA.YSB.YSMF,119W37.12,37N45.34,YOSEMITE FALLS
US.CA.YSB.GGG1,119W34.23,37N44.73,AHWAHNEE HOTEL
US.CA.YSB.GCRP,119W34.30,37N43.67,GLACIER POINT
```

*Fig. 10C*

AD,ANDORRA
AE,UNITED ARAB EMIRATES
AF,AFGHANISTAN
AG,ANTIGUA AND BARBUDA
AI,ANGUILLA
AL,ALBANIA
AM,ARMENIA
AN,NETHERLANDS ANTILLES
AO,ANGOLA
AQ,ANTARCTICA
AR,ARGENTINA
AS,AMERICAN SAMOA
AT,AUSTRIA
AU,AUSTRALIA
AW,ARUBA
AZ,AZERBAIJAN
BA,BOSNIA AND HERZEGOVINA
BB,BARBADOS
BD,BANGLADESH
BE,BELGIUM
BF,BURKINA FASO
BG,BULGARIA
BH,BAHRAIN
BI,BURUNDI
BJ,BENIN
BM,BERMUDA
BN,BRUNEI DARUSSALAM
BO,BOLIVIA
BR,BRAZIL
BS,BAHAMAS
BT,BHUTAN
BV,BOUVET ISLAND
BW,BOTSWANA
BY,BELARUS
BZ,BELIZE
CA,CANADA
CC,COCOS (KEELING) ISLANDS
CF,CENTRAL AFRICAN REPUBLIC
CG,CONGO
CH,SWITZERLAND
CI,COTE D'IVOIRE (IVORY COAST)
CK,COOK ISLANDS
CL,CHILE
CM,CAMEROON
CN,CHINA
CO,COLOMBIA
CR,COSTA RICA
CS,CZECHOSLOVAKIA (FORMER)
CU,CUBA
CV,CAPE VERDE
CX,CHRISTMAS ISLAND

*Fig. 11*

METHOD OF IDENTIFYING GEOGRAPHICAL LOCATION USING HIERARCHICAL GRID ADDRESS THAT INCLUDES A PREDEFINED ALPHA CODE

RELATED APPLICATIONS

This application is a continuation of U.S. Ser. No. 09/257,462, filed on Feb. 25, 1999; which is a continuation-in-part of U.S. Ser. No. 09/188,153, filed on Nov. 4, 1998 now U.S. Pat. No. 6,047,236, which is a continuation of U.S. Ser. No. 08/701,586, filed on Aug. 22, 1996 and now issued as U.S. Pat. No. 5,839,088.

BACKGROUND OF THE INVENTION

1. Field of the Invention

The present invention relates to a geographic location referencing system and to a system, method and computer program product for automatically providing informational services to users based on their geographical location.

2. Related Art

The Internet has revolutionized the way people acquire information. Seemingly limitless volumes of data are now instantly available to users from their homes, offices, schools and libraries. Portable devices of various types including portable computers, personal data assistants, wireless communication devices (i.e. cellular phones) and in-vehicle navigation and computer systems can or will be used to access the Internet from any location.

Currently, services offered on the Internet do not cater to mobile users. In fact, it is often cumbersome to interact with current Internet services using portable devices due to the interactive nature of on-line sessions that generally require substantial user input. This can raise safety concerns, for example, in automotive Internet access devices. What is needed therefore, is a system and method that provides Internet services to mobile users with reduced user input requirements. In addition, what is needed is a system and method that provides Internet services to mobile users that are customized according to each user's geographical location.

Further, what is needed is a system and method for providing a geographic location referencing system that can be easily adapted to provide automated Internet services based on location. One such referencing system that can be used with the present invention is described in the above referenced related patent application, now U.S. Pat. No. 5,839,088 ("the '88 patent"), entitled "Geographic Location Referencing System and Method". The '88 patent and the present patent application are commonly owned.

The '88 patent describes a geographic location referencing system that has an addressing scheme that allows a location to be uniquely addressed using proprietary names unique to a geographical area. The geographic location system is contrasted with prior systems that are not suitable for Internet related services. Such systems include geodetic latitude and longitude, Universal Transverse Mercator (UTM), Military Grid Reference System (MGRS), World Geographic Reference System (GEOREF), Maidenhead, Trimble Grid, Trimble Atlas, and Thomas Brothers Detail.

These prior systems can generally be divided into two categories: global and local. The global systems, such as geodetic latitude and longitude, UTM, MGRS, GEOREF, Maidenhead, and Trimble Grid, use a scheme that subdivides the globe into areas of increasing resolution, until a particular location is properly identified. Thus each location address is referenced to the global system, allowing for the easy comparison of two location addresses. However, the addresses tend to be complicated, cumbersome, and unrelated to the real world, increasing the complexity of these systems.

The local systems, such as Thomas Brothers paper mapping systems, provide a technique that assigns location addresses based on association with a geographic region or physical map pages, with every location identified with only one region The local systems are suitable for use in connection with a physical map. However, such local systems are difficult to use with respect to a more global or electronic system, as there is no simple way to convert a local address into a global address, and the local address is not recognized in the global systems.

Location technology has been significantly impacted by the wide availability of Global Positioning Systems (GPS), which are operated by the United States Department of Defense to provide worldwide navigation, position location, and precision timing services. GPS comprises a global network of satellites that interact with a controller coupled to a GPS receiver, allowing the controller to precisely determine its location. This location is typically output from the GPS receiver as latitude and longitude numbers, which are cumbersome for users to understand and use. A GPS receiver is sometimes coupled with additional capability that allows the raw latitude/longitude numbers to be converted into a more useful and usable format. See, e.g., Sprague et al., U.S. Pat. No. 5,422,814; Inoue, U.S. Pat. No. 5,289,195; and Yamasnita, U.S. Pat. No. 5,471,392. However, even with these enhancements, a problem with these systems is that they are still difficult to use by persons who are unskilled in the use of location referencing systems. Another problem is that these systems are unwieldy because they still retain their global character. Still another problem with these systems is that they are not readily adaptable for use with computer networks such as the Internet.

Private commercial tracking systems in use today provide the ability to automatically track the location of, for example, a fleet of trucks, e.g. see U.S. Pat. Nos. 5,155,689; 5,299,132; 5,398,190; 5,454,027; 5,513,111; and 5,519,621. These patents are all related to a commercial vehicle locating and communicating system that uses either a cellular network or a GPS system for tracking, and locating vehicles.

The problem with these proprietary systems is that they are very complex, expensive and limited to very specific functions. What is needed is a referencing system that can be used with a minimum amount of reading, scrolling, and searching, and with a limited number of keystrokes for data entry. In addition, what is needed is a user-friendly, truly local addressing system that is easily convertible to a known global system for wide-range concerns. Further, what is needed is a flexible system and method that can be used to automatically provide mobile users with relevant information customized for their current location. Additionally, what is needed is a system and method that caters to mobile Internet users by providing customized services based on geographic location.

SUMMARY OF THE INVENTION

The present invention relates to a system and method for providing services over a computer network, such as the Internet, for users in mobile environments. Specifically, the system and method of the present invention provides users with information that is specific to the user's geographic location.

In a preferred embodiment, a client computer system is equipped with a local database, a wireless transceiver, in input device such as a keyboard, an output device such as a display and an automatic location identifying (ALI) device, such as a GPS receiver or the like. Note that the ALI device is an optional component of the present invention.

The Client computer system connects with a server coupled to a computer network, such as the Internet. The server is enhanced in accordance with the present invention by automatically determining the location of the client. In one embodiment, the client automatically advises the server of its current location via a transmission of an electronic data packet or "handshake" upon connection. The server uses this information to perform a database query to retrieve information that is customized for the particular location.

In particular, an application program is installed on the client computer system. The application program prompts the user to select a category of interest, a preference for specifying location information (i.e. via manual input, or automatically through an attached ALI device), and other user preferences. The application program then builds a data packet on the client storage device that contains such information.

In one embodiment, the client first connects with a primary server. The primary server maintains a database that contains a list of registered servers that provide location specific services in accordance with the present invention. The primary server reads the data packet from the client and performs a database query to retrieve the address for a particular enhanced server that matches the client's request. The client is then sent a specific universal resource locator (URL) that contains the address of the enhanced server.

The client computer system then launches a web browser or the like, and connects with the URL. Upon connection, the client automatically displays relevant data that is customized for the user's geographic location without additional input from the user.

For example, in one embodiment, a web site that provides geographical maps is implemented in accordance with the present invention. Thus, upon connection with the URL provided by the primary server, the client is automatically presented with a map of the current geographical area. This is accomplished automatically, without additional manual input from the user. This aspect of the present invention is especially useful in a mobile environment, such as an automobile, where data entry is not only cumbersome, but also dangerous.

In another example, a user connects to a weather service, whereby the service automatically displays a weather report for the current area. Again, this is accomplished Without requiring that the user manually enter data related to the current location.

In another example, a user connects to a service that automatically provides information about restaurants, banks, or other points of interest that are located within a specified distance from the user's current location.

Current location data can be automatically provided by a variety of ways. For example, a GPS receiver can be used to determine the exact location of the user. In another example, a cellular telephone connection can be used for determining location information using triangulation or distance measuring techniques.

A feature of the present invention is that it provides mobile users with customized information about their current location.

An advantage of the present invention is that it provides mobile users with customized information about their current location with a minimal amount of manual data entry.

Another advantage of the present invention is that the hierarchical structure of the grid referencing system used to describe location information allows for faster database searches so that customized information can be presented to users in real-time with minimal delays.

Another advantage of the present invention is that the grid referencing system allows for information to be manually entered with a minimum amount of reading, scrolling, and searching and with a limited number of keystrokes for data entry.

Another advantage of the present invention is that it promotes the use of Intelligent Transport Systems (ITS) for tracking, managing and re-routing commuter traffic. The present invention facilitates the use of such systems due to the simplified methods for inputting location data, which is a frequent requirement of Intelligent Transport Systems.

Another advantage of the present invention is that the grid referencing system promotes the use of voice recognition systems because location descriptions are limited to 26 letters and 10 numbers. Accordingly, using the grid referencing system reduces the requirement for sophisticated voice recognition systems that typically require speech recognition of thousands of different sounds, languages, dialects and accents used with conventional street addressing techniques.

In a separate aspect of the present invention, location information is described using a universal location address that is defined by subdividing a geographic location into several independent districts, each with a name and a reference point. The reference point has a known locational address within a global referencing system. A coordinate system is placed on the district relative to the reference point, yielding a position indicator for locations within the district. Combining the district name and the position indicator defines the local location.

In another separate aspect of the invention, the foregoing aspect may be further enhanced by the creation of proprietary locational addresses. A proprietary address is a name, which will be unique within the district that distinctly identifies a location with the district. A proprietary address is created by selecting a name, capturing positional information about the location associated with the name, checking that the name is unique in the district and storing the name with its associated locational information and feature data. Once stored, the name and the associated information may be selectively disseminated to users of locational systems.

In another aspect of the invention, a locational system first accepts regional or positional information to determine a general location address, including a district name. The locational system then accepts specific addresses, each having less than a complete locational address. The locational system creates a complete locational address by combining the known general positional information with the abbreviated specific locational address to determine the precise and complete locational address, generally by prefixing the known general positional information to the specific locational address.

In another separate aspect of the invention, a navigational system incorporating the foregoing aspects is defined.

Further features and advantages of the invention, as well as the structure and operation of various embodiments of the invention, are described in detail below with reference to the accompanying drawings.

BRIEF DESCRIPTIONS OF THE DRAWINGS

FIGS. 8a–8b, 9, 10a–10c, 11 are examples of specific files used in one implementation of the subject invention.

PREFERRED EMBODIMENTS OF THE GEOGRAPHICAL REFERENCING SYSTEM

A preferred embodiment of the geographical referencing system aspect of the present invention allows a point of interest (POI) within an arbitrary geographic area to be uniquely identified with a locational address, and the locational address to be related to other known global referencing systems. The locational address may take two forms: first, as a universal locational address (ULA); or second, as a proprietary locational address (PLA). Each of these forms is discussed below.

Every location in a geographic area will have at least one ULA. To determine the ULA of a point, a geographic area is divided into several districts. The districts may be of differing size and shape, and may contain a particular identifying feature. For example, the geographic area of the United States may be subdivided into numerous districts, which may be strategically located, sized, and named with reference to cities or other geographic or political features in order to associate the districts with such features. Advantageously, such districts are chosen relative to cities and it is therefore convenient to name each district according to the city about which the district is located. In fact, each city may have a reference point, allowing local locations to be addressed relative to the local city. Sparsely populated areas may have larger districts, and densely populated areas may have smaller districts. The districts may also be quasi-rectangular, following latitude and longitude lines. In more densely populated areas, it is possible that a particular location will be within the boundaries of two or more districts. In addition, user-defined districts, reference points, and grid sizes are possible. For example, a search and rescue operation may establish a reference point and grid size convenient for a particular search area, or a group of hikers may choose a reference point and grid size appropriate for a particular outing.

Figure 1:
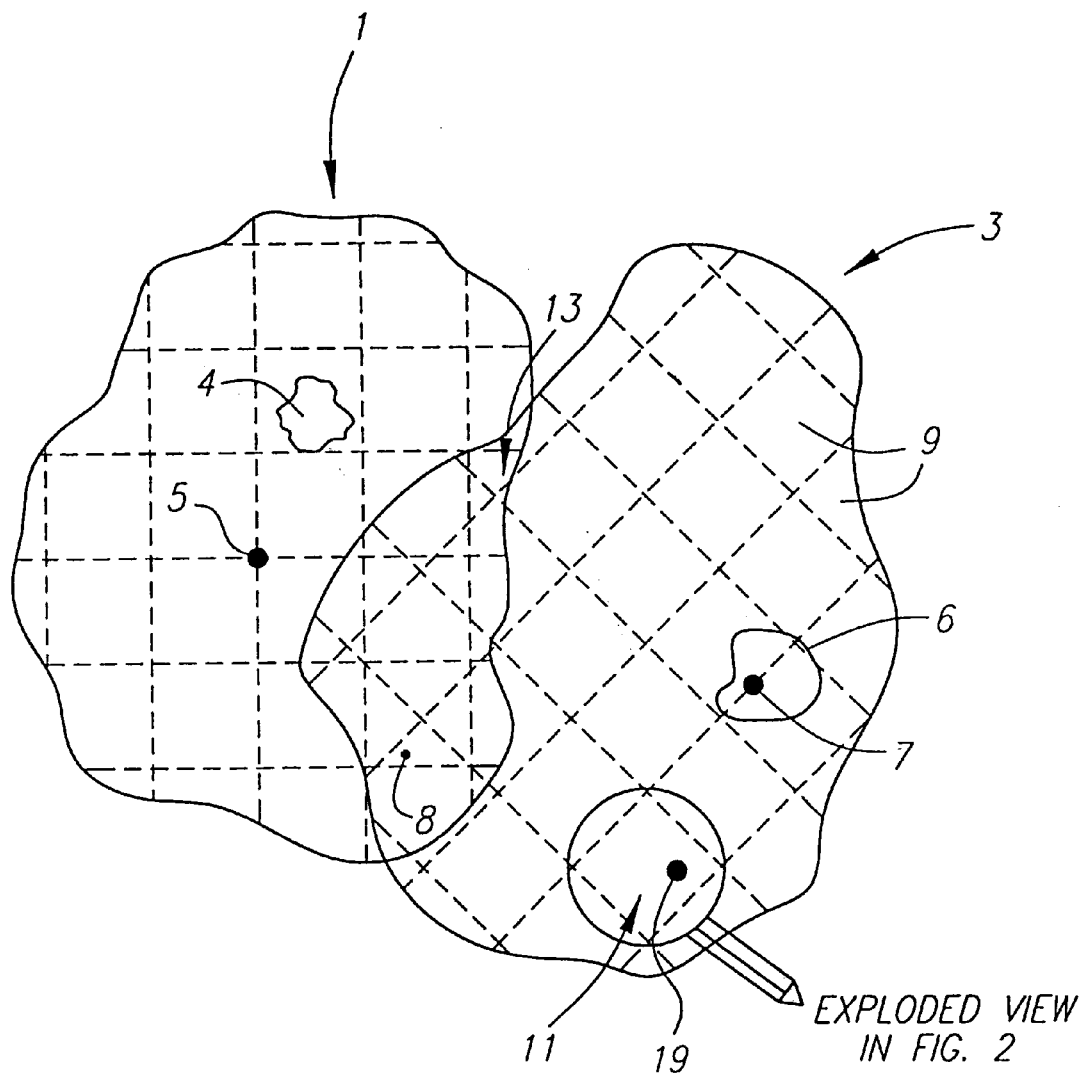
FIG. 1 shows two overlapping districts, each with a reference point and a grid system.

After the districts have been selected and named, a reference point is chosen for each district, and a grid system placed relative to the reference point. Advantageously, the grid system is referenced north. Referring to FIG. 1, a first district 1 and a second district 3 are defined relative to major cities 4 and 6 respectively. In this example, major city 4 in the first district 1 will be named CITYONE and the major city 6 in the second district 3 will be named CITYTWO. For convenience, the first district 1 will be named CTY1, referring to the major city within that district's borders, and the second district will be named CTY2, referring to the major city within that district's borders. Reference point 5 is selected as the reference point for CTY1, and reference point 7 is selected as the reference point for CTY2. The reference point will not necessarily be located proximate to the feature used as the name for the district. Each reference point 5 and 7 has a known address within a global referencing system such as World Geodetic Systems (WGS). Association with a global system offers at least three important functions: first, local addresses may be easily converted to global addresses and vice-versa; second, inter-district relationships are established; and third, easy integration with known navigational systems is provided. Thus, an easy to use district-level addressing system retains the advantages of a global system without attaching complexity.

As can be seen in FIG. 1, the grid system about each reference point 5 and 7 creates cells 9 in each district. Each of these cells 9 is identified with a cell code, which advantageously is a two character number. For example, a target POI location 19, which is in cell 11, can now be identified by referring to its district and cell code, e.g., CTY2-11. Of course, such a reference lacks the resolution to identify a particular feature, such as a house, but may be enough resolution to locate a lake or park. The issue of increased resolution is discussed below.

Also, it is likely that there will be an overlap area 13 that is formed at the intersection of districts. Within this overlap area 13, any POI can be identified by reference to any district within which it is located. Thus, a target location 8 in the overlap area 13 can be identified by either association with the CTY1 or CTY2 districts, or any other district within which it is located. In the preferred embodiment, a locational system can provide a locational address relative to any reference point or district by simply toggling between reference points.

Figure 2:
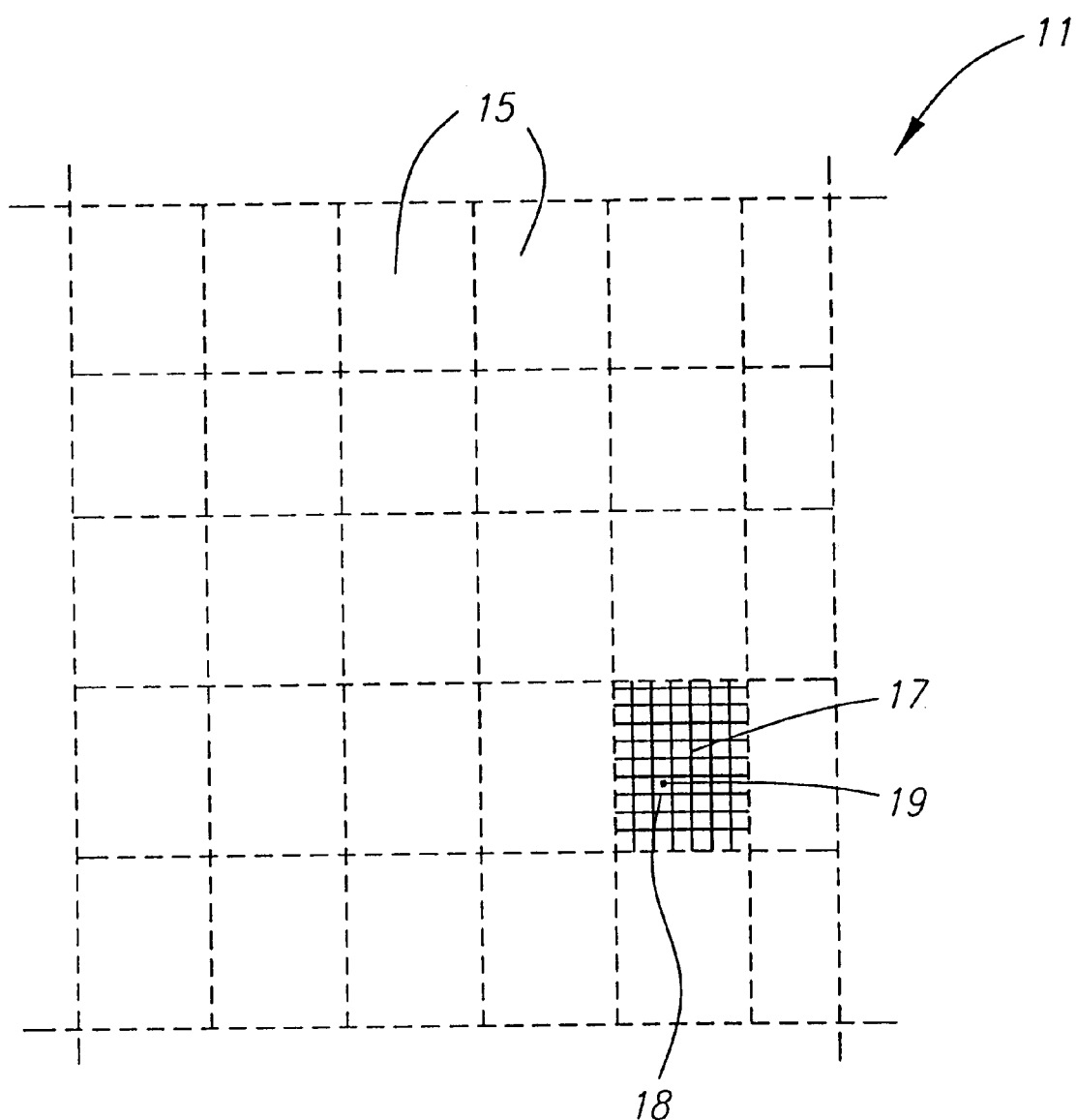
FIG. 2 shows a single cell of FIG. 1 with hierarchical gridding to increase the addressing resolution.

As discussed above, a district name and cell code may not give sufficient resolution to locate specific locations. To increase resolution, a hierarchical grid is applied to each cell 9 of FIG. 1. For example, cell 11 is shown in FIG. 2 with a sub-grid applied, producing sub-cells 15. Each of these sub-cells can be identified with a sub-grid code. Moreover, the sub-cells can be further subdivided to increase resolution. Here, sub-cell 17 is further subdivided. As can be seen in the figure, the target location 19 is within the sub-sub cell 18. Thus, to more definitively identify the target location 19, a ULA is formed from the highest resolution sub-cell defined and each of its parent cells. The locational address is formed by appending to the district name each sub-cell code in hierarchical progression, moving from lower resolution to more resolution. In the example here, the target location 19 would have a locational address of CTY2-11-17-18. Based on the size of the district, if this does not give the necessary resolution to properly locate the target location 19, then additional levels of gridding hierarchy can be added. Although, in this example, each cell was randomly named with a unique numerical code, it should be appreciated that a consistent Cartesian coordinate system can also be used, with each cell defined by an (X, Y) coordinate pair. Those skilled in the art will recognize several other alternative ways to define a grid system.

In a preferred embodiment, the above coding technique is extended to include standard alpha codes representing objects such as suites, floors, rows, columns, altitude, etc. These alpha codes are advantageously appended to the above code as they logically represent the highest resolution component. Thus for example, suppose the above locational address of CTY2-11-17-18 represents an office building, then the address of CTY2-11-17-18-S101 represents suite 101 in the office building. Likewise, the address CTY2-11-17-18-F2 represents the second floor of the office building. In another example, the address CTY-1 1-17-18-R101-RW12-C22 represents row 12 column 22 in room 101 of the office building. This can represent an exact location within a particular rack in a warehouse, for example. In another example, the address CTY2-11-17-18-HS2200 represents a height of 2200 feet above sea level.

As can be appreciated by those skilled in the relevant art(s), this technique can be extended as much as required. Typically, a standard set of codes is defined for each specific implementation of the present invention. An example of such a set of codes that can be used In an embodiment of the present invention is shown below in Table 1.

TABLE 1

Example set of alpha codes and their definitions.

| Alpha Code | Definition |
| --- | --- |
| AL | AISLE |
| A | APARTMENT |
| AD | ADDRESS |
| BX | BOX |
| B | BIN |
| BY | BAY |
| C | COLUMN |
| CS | CASE |
| D | DOOR |
| DP | DEPTH |
| DY | DAY |
| EL | ELEVATOR |
| EN | ENTRY |
| E | ELEVATION |
| ES | ESCALATOR |
| F | FLOOR |
| FD | FIELD |
| GR | GARAGE |
| G | GATE |

TABLE 1-continued

Example set of alpha codes and their definitions.

| Alpha Code | Definition |
| --- | --- |
| H | HEIGHT |
| HE | HEIGHT ABOVE ELLIPSOID |
| HG | HEIGHT ABOVE GEOID |
| HO | HEIGHT ORTHOMETRIC |
| HS | HEIGHT ABOVE SEA LEVEL |
| HT | HEIGHT ABOVE TOPOGRAPHICAL SURFACE |
| HU | HOUSE |
| LK | LOCKER |
| L | LEVEL |
| NO | NUMBER |
| PO | P.O. BOX |
| PH | PHONE |
| R | ROOM |
| RW | ROW |
| RD | ROAD |
| ST | STREET |
| S | SUITE |
| SC | SECURITY CODE |
| SN | SECTION |
| SE | SEAT |
| T | TIME |
| TR | TRAM |
| TN | TRAIN |
| TK | TRACK |
| U | UNIT |
| X | INTERSECTION |
| Z | ZIPCODE |

Advantageously, a city will be named with a specific abbreviated name for purposes of navigating to and around that city. That abbreviated name may also serve as the name of the defined district located about that city. Depending on the size of the city and various geographic, political, and other features relating to the city or region, the district for that particular city will be pre-defined with a particular grid size, although the system may allow altering the grid size for particular purposes. If, in the preceding example, the defined grid size for CTY2 is approximately 30 by 30 nautical miles, identifying two hierarchical grids produces a resolution of about 500 meters, which is sufficient for locating structures in open areas or large targets such as lakes or parks. By adding a third and fourth hierarchical grid, a resolution of about 5 meters is achieved, and by adding a fifth hierarchical grid, a resolution of about 0.5 meters is achieved. By adjusting the number of grids, then, the resolution of the resulting locational address is changed to meet the requirements of the particular area or user. Advantageously, each level of the hierarchical address is separated by a decimal point. Thus an address may appear as "DISTRICT.12.34.56.78". Those skilled in the art will recognize several alternatives to this approach.

Figure 4:
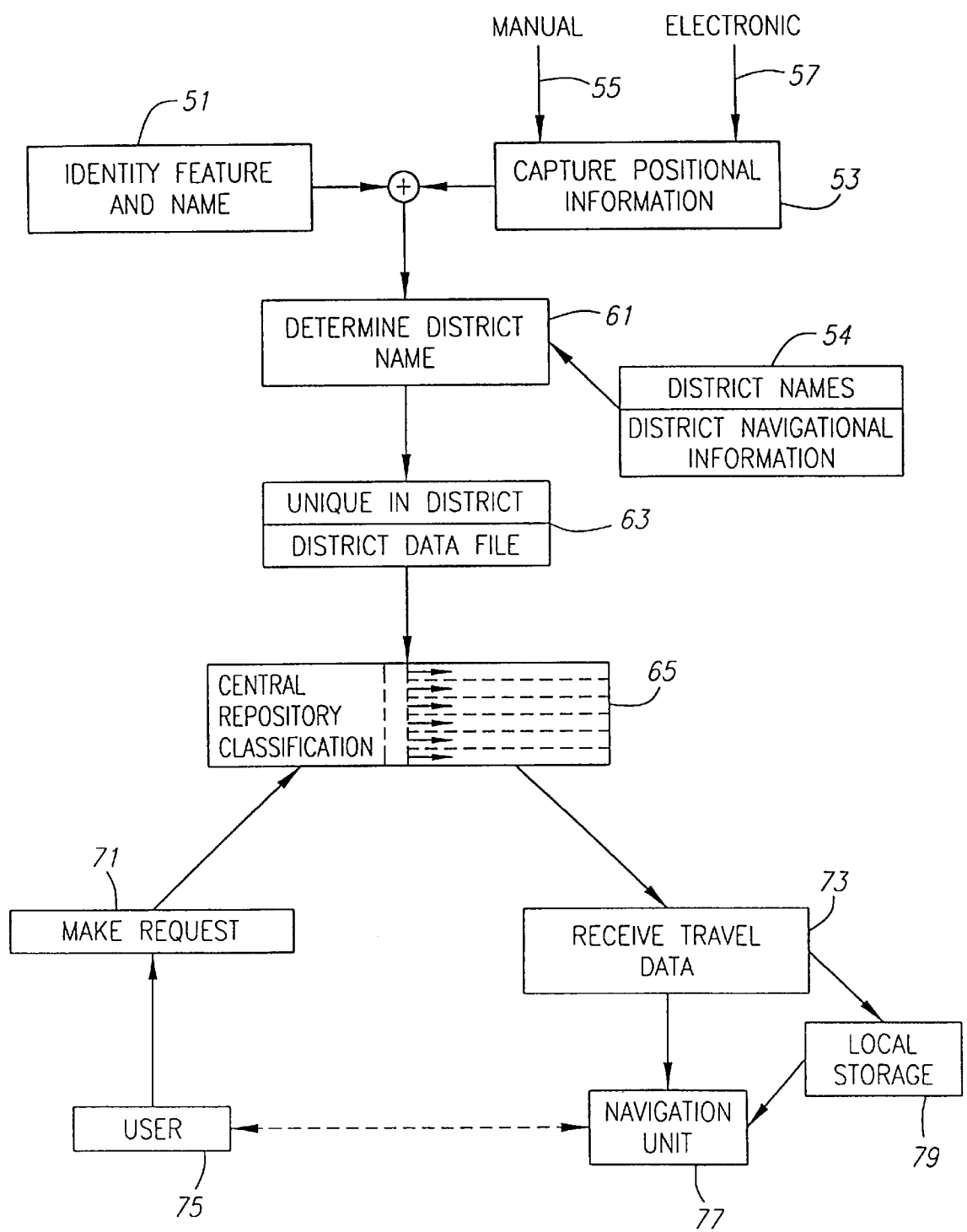
FIG. 4 shows how proprietary locational names are compiled and distributed.

The second way a point of interest may be designated in the subject invention is with a proprietary locational address (PLA). Referring, to FIG. 4, the first step in using a PLA is to identity the feature and select a name 51. A PLA is a name chosen to identify a physical structure or location. The name can be chosen by the operator of a locational service, as in the case of naming national monuments, or the name can be chosen by individual or corporate users of the locational service. Individuals may even want to identify their homes using their own names. Thus, a Ms. Mary Smith may name her house MARY.SMITH.HOUSE, for example. Thus, when Ms. Smith wants to direct someone using a locational service to her house, she identifies her location using MARY.SMITH.HOUSE, rather than a street address or other locational referencing system. A corporation, too, may desire to allow customers to locate it using a common name rather than a less personal addressing system. For example, a nationwide enterprise such as MacDonalds with many locations may choose a PLA that is associated with its tradename or product or otherwise allows users to easily remember and associate the establishments PLA. Abbreviations are useful as it keeps user input to a minimum, increasing safety, reliability, and convenience. Since the nation-wide enterprise may have many locations in a single metropolitan area, each may be identified by appending to the enterprise's PLA a unique identifier to identify specific branch offices or affiliates. Wildcard searching is also provided, allowing several locations of the known nation-wide enterprise to be found for a particular geographic area.

The capture of positional information for a certain name will now be described. Referring to FIG. 4, as indicated by identifying numeral 55, positional information could be entered manually, by, for example, inputting the ULA or coordinates of the location from a known mapping system. Alternatively, as indicated by identifying numeral 57, the positional information may be read electronically using a system such as the GPS. Referring again to FIG. 4, the name 51 and positional information 53 are associated. The district in which the location is identified is determined by comparing the positional information 53 to stored district locational information 54. Once the district is identified, the name is checked against other reserved names in the district to assure the selected name is unique. If the name is unique, it is placed in a district data file 63. As can be seen from the discussion above, uniqueness of the name need only be checked at the district level. Consequently, the same name can be present in different districts. The name must be unique at the district level as the district name usually becomes part of the PLA. For example, the nation-wide enterprise location in district CTY1 could have a full PLA of CTY1-TRADENAME. If the owner of a name desires to more widely reserve a name, each district will be checked individually.

Once a PLA is approved for an individual, corporation, or other entity, the PLA may be placed in promotional material such as advertisements, coupons, billboards, or other means of communication. By providing a PLA that describes a feature, a particular location may be quickly identified and readily found.

Once cleared for conflicts, the name, positional information, and any other useful information are stored in a central repository location. This storage may be sortable and selectively downloadable by users of locational systems. For example, the central repository may be accessible via the Internet. In such a case, a user 75 would make a request for information 71 concerning future travel, such as the ULAs or PLAs of specific desired waypoints of a trip. The information in the central repository 65 is selected and sorted, and the travel data 73 is received by the user, creating a travel profile. To ease the data selection process, the central repository may store preferences for the user. After receiving the travel profile, the user places the travel data 73 into a navigational unit 77, augmenting information 79 already locally present in the navigational unit 77. The user 75 may then use the travel data 73, including PLAs and ULAs, to assist in navigating.

Figure 3:
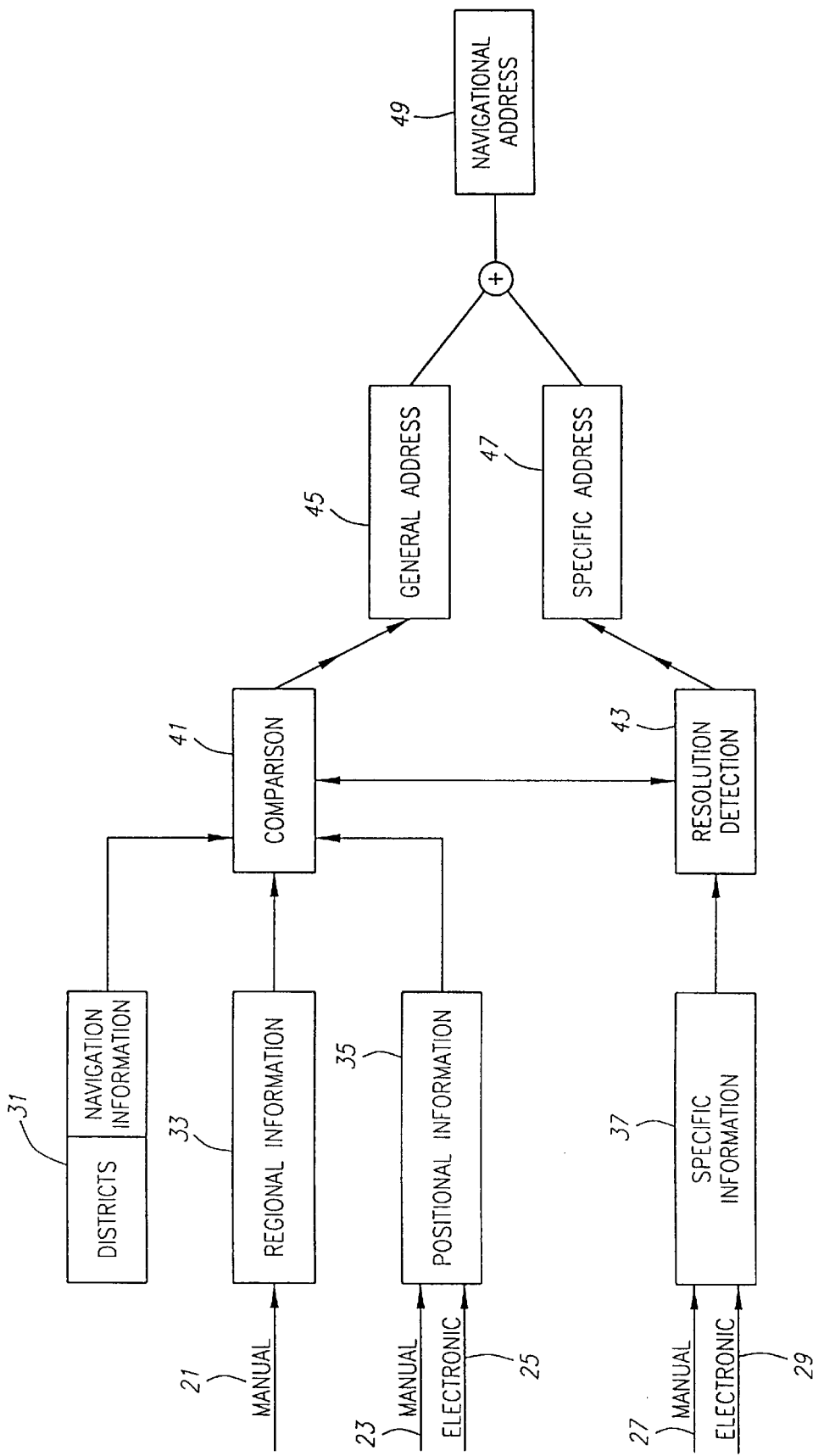
FIG. 3 is a functional diagram of a preferred embodiment of the invention.

An aspect of the subject invention is the use of ULAs and PLAs in known navigational systems. The use of a ULA by such a system with a minimum amount of information input by a user will now be disclosed. Referring to FIG. 3, district file 31 is maintained correlating district names and locational information relating to those districts. Regional information 33, that may be manually entered (as indicated by reference numeral 21) by a user, may also be maintained. This regional information 33 is used by the system to reduce the amount of information a user must enter to identify a particular location. The regional information may, for example, be a map code or distinct name identifying the general area covered by the map. Alternatively, it may be the name of a district having a pre-defined grid. After the map code or district name is inputted as regional information, the system now assumes that any future user inputs are within the geographical area defined by the regional information, thus reducing the complexity of inputting future addresses referenced on that map. Also, positional information 35 of a current location may be input manually (reference numeral 23) or electronically (reference numeral 25) for the same purpose. By knowing the present location, the system may assume that any subsequent address input by the user is within the same geographical area as the present location. Again, the purpose and effect is to reduce the complexity of inputting locational addresses.

The user may also electronically (reference numeral 29), or manually (reference numeral 27) input a specific address 37 to the system. By comparing the regional information 33 and positional information 35 of the current location with the stored district information 31, a general address can be formed. This general address will contain the district name plus any cell and sub-cell codes that are more general than the most general code in the specific address. The resolution detector 43 attempts to determine how much resolution is represented by the specific address 37 input by the user, and in conjunction with the comparison 41 function, creates a general address 45 with the correct level of resolution. Again, it is assumed that any subsequent addresses input by the user are within the same geographical area defined by this general address.

Once the resolution of the specific information 37 is determined, the specific information 37 is passed on to become a specific address 47. This specific address 47 is appended to the general address 45 formed above to form the final locational address 49. The locational address 49 is then used by the navigational system to assist in navigation. Additionally, an emergency mode may be provided in which a present location is automatically referenced to any reasonably close PLA or other known location.

A relationship with World Geodetic System 1984 (WGS-84), allowing locational addresses to be converted to other global addressing systems, is also provided. A further description of the district grid is needed to understand this relationship. Each district has a reference point, with the reference point being the approximate center of the city used in naming the district. A grid is placed in relation to the reference point such that the origin of the grid is aligned with the nearest intersection of latitude and longitude lines corresponding to the largest grid resolution in the district. Since the reference point has a known WGS-84 address, by knowing the origin offset, the district rotation, and the district scale, every ULA can be translated into a WGS-84 address, and from there into nearly all locational reference systems. Conversely, every WGS-84 address may be translated into one or more ULAs. The translation is simplified in the subject invention as the district grid system is generally aligned to the WGS-84 latitude/longitude grid.

Figure 5:
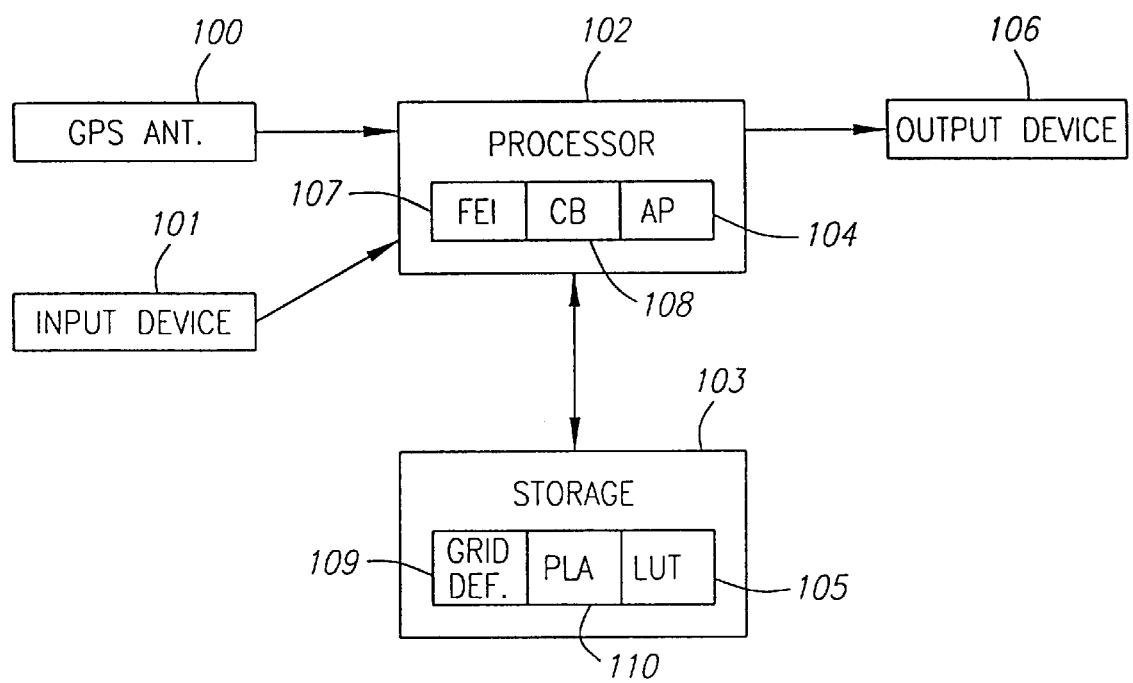
FIG. 5 is a diagram of a navigational system incorporating one or more aspects of the subject invention.

With reference to FIG. 5, such a system comprises a GPS receiver 100, an input device 101 such as a keypad or the like, a processor 102, a storage device 103 such as RAM or ROM, and an output device 106 such as a display. The GPS receiver 100, input device 101, storage device 103, and output device 106 are all coupled to the processor 102 as shown. An application program 104 executes in the processor to perform various tasks. Optionally, a look-up-table (hereinafter "LUT") 105 is provided in the storage device 103.

The application program in a conventional navigational apparatus typically interfaces with and directs the aforementioned elements to perform the following tasks:

1. Displays the latitude and longitude (hereinafter "lat/lon") of the unit—First, the GPS receiver receives signals from the GPS satellite constellation, and calculates the location of the unit (in terms of lat/lon) using these signals. The lat/lon coordinates of the unit are then displayed on the output device 106.
2. Displays velocity and bearing—if the unit is moving, the processor determines the location of this unit at selected time intervals, and based thereon, determines velocity and bearing. Once determined, this information is displayed on the output device 106.
3. Allows for the selection of waypoints—In one approach, a user inputs waypoints through input device 101 in terms of lat/lon coordinates. In another approach, common in the aviation community, a look-up-table or the like, identified with numeral 105 in FIG. 5, is provided, correlating pre-determined waypoints with lat/lon coordinates. A capability for searching through the database and selecting particular waypoints is also provided in this approach.
4. Displays distance and bearing from selected waypoints—once the way,points have been determined, the distance (assuming straight line) and bearing from these waypoints is determined and displayed.

Additional components of the system which are added by the subject invention include context buffer 108; front-end interface (hereinafter "FEI") 107; PLA database 110; and a database(s) 109 of grid definitions.

A critical function of the front-end-interface is to convert ULAs and PLAs into lat/lon coordinates. Consequently, a user can input waypoints in terms of ULAs or PLAs, and the FEI will convert the same to lat/lon coordinates for use by the unit in determining a directional and/or distance indicator (such as distance and bearing) from the waypoints. Additionally, positional information defined in terms of lat/lon coordinates can be displayed in terms of one or more ULAs of the subject invention. The FEI also includes various searching capabilities to allow a user to search through the PLA database 110 for particular waypoints or waypoints with particular characteristics.

The function of the context buffer 108 is to define the current district and grid in which grid addresses are assumed to be defined.

The grid definition file(s) 109 specifies all the grids which have been defined to date. For each grid, all the parameters necessary to define the gird are stored. Such information includes the lat/lon coordinates of the reference point of the grid, the dimensions of the grid, and the rotation and scaling of the grid cells. Thus, all the information needed to convert between a grid address within the grid and lat/lon coordinates is provided.

The PLA file 110 is a file which for each district correlates each PLA which is unique to and has been reserved for use in the district with its corresponding grid address.

The navigational system described above may be mounted in a vehicle or contained in a portable device, for example. Additionally, the navigational system may stand alone or may be integrated into existing devices, such as portable phones. Further, the subject invention may be incorporated into a general computational device such as a microprocessor. Since the physical manifestation of the navigational system is so flexible, there are numerous foreseeable applications.

DETAILS AND EXAMPLES OF SYSTEM IMPLEMENTATION

The examples set forth below describe various details of various implementations of the system. Examples 1, 1A, 2, and 3 demonstrate specific implementations of one embodiment of the invention: Example 1, demonstrates the use of Hierarchical Identifiers for districts which arc correlated with Country, State/Province, and City districts along with PLA's and a purely numeric ULA grid referencing system based upon a district grid size of approximately 185 kilometers north to south. Example 1A demonstrates an alternative means that can be used to implement the city grid based on the Transverse Metcator projection system. Example 2 demonstrates the use of the Hierarchical Identifiers described in Example 1 along with an alternating alpha-numeric ULA grid referencing system. Example 3 demonstrates the use of a smaller City Grid and the resulting higher precision at various grid levels.

EXAMPLE 1

Hierarchical Identifiers For Country, State/Province, City

The example assumes the existence of higher levels of hierarchical codes for identifying countries, states/provinces, and cities. The top level codes can be used, implied by context, or specifically ignored by the use of dots (periods) to make it clear how many codes have been omitted. A code of 'US.CA.LA' might be represented as 'LA', '..LA', or by 'CA.LA', depending on the geographic context or the need for clarity.

In all cases, upper level codes are dropped when the geographic context is clear, to prefix with dots (periods) when necessary to insure clarity, and to append lower levels to add precision.

Country Codes

Top level: two alpha character mnemonic (possibly based on Internet domain odes).

Examples:

United States=US

Australia=AU

Canada=CA

State/Province Codes

Second level: two character mnemonics (advantageously based on US postal codes within the US).

Examples:

California=CA

New York=NY

City Codes

Third level: two or three alpha character mnemonics from city name unique within each state.

Examples:

Carbondale=CAR

Hartford=HAR

Los Angeles=LA
New York City=NYC
Proprietary Codes
Fourth level; one or more alpha or numeric characters which are unique within a specific grid or map with a unique map code
Examples:
MACD, DISNEY, EXXON, etc.

An example of a use of a PLA might be US.GA.ALB..MACD to refer to a MacDonalds in Albany, Georgia; US.GA.ALB.MACD* to refer to the closest(s) one in Albany, Georgia; or MACD* to refer to the closest(s) ones in any city.

The code ..ALB.MACD* could refer to either the nearest MacDonalds in Albany Georgia or Albany New York and context. .NY.ALB.MACD* would resolve the context.

City Grid

This optional code is at a fourth or fifth level; identified by the first use of a pair of numeric characters in the city grid code. The city rid system requires an approximate city centroid described in a locational reference system such as geodetic latitude and longitude and the meaning of each pair of grid designators. The city grid origin is defined at the south-west coordinate system intersection value corresponding to exact values of the largest grid resolution precision that is defined in the city grid, placing the district centroid within the center grid cell of the system.

In the nominal city grid system, the grid cells are orthogonal to the defining coordinate system; however, rotations and scale parameters can be used to re-define the relationship between the city grid and the reference frame. False easting and false northing offsets (translations) are normally used to avoid negative numbering or to allow convenient ordering of alphanumeric designators.

Conversion from the defining reference frame (e.g., lat/lon) to city grid designators (i.e., ULAs) is accomplished by computing conversion constants based on the initial reference frame and the specific city grid definitions. When geographic context has already been established, grid designators are computed with respect to the currently selected district. When no district has been selected as the preferred one, the nearest district centroid is used as the basis for the grid designators. Conversion from city grid to coordinates in the defining system is accomplished by applying translation (and when applicable rotation and scale) parameters to the succession of grid designators until the precision implied by the number of grid cell designator pairs is reached.

The city grid is nominally based on a locational reference system that can be tied to other reference systems. In the nominal system, the underlying locational reference system datum is the World Geodetic System 1984 (WGS-84). Geodetic coordinates with respect to this datum can be converted to coordinates in a large number of other reference systems, allowing the city grid designators to be used with respect to other systems and other geodetic datums allowing conversion to Universal Transverse Mercator (UTM) systems, State Plane Systems, National Grid Systems, other horizontal coordinate system, or map projection.

The city grid origin is defined at the ten minute of latitude and ten minute of longitude intersection nearest the city centroid. This places the origin within five minutes of latitude and longitude of the city centroid. The radial distance of the city grid origin is then always within about 10 km of the nominal city center.

Each grid is then defined based on this origin by placing a grid centered at the origin with a false easting and northing=halfway between minimum and maximum numeric characters. Grid cells are identified by an easting cell designator paired with a northing cell designator with successive pairs of designators defining grid cells of increasing precision.

Highest level; least precision two numeric characteristics, East is always first, North is always second, minimum is always 0 and maximum is always 9.

The false easting puts the division between 4 and 5 at the grid origin north and east. Each highest level grid consists of a ten by ten region (100 grid rectangles).

Next lower level; higher precision, divides each numeric grid into a ten by ten grid (100 grid rectangles) area. East is always first, north is always second. Minimum is always 0 and maximum is always 9.

The false easting again puts the grid rectangle center at the division between 4 and 5.

Next lower levels repeat the numeric code above dividing each higher grid rectangle into a ten by ten rectangle area.

If each city grid origin is at an integer intersection of an even ten minutes of latitude and longitude, the first level numeric grid rectangles each cover an area of approximately 100 square nautical miles, or about 343 square kilometers with grid cells whose north-south extent is about 18.5 kilometers. Thus the entire set of first level grid cells covers a distance of about 185 kilometers from north to south and a shorter distance from west to east, depending on latitude.

Each second level city grid cell is $1/10^{th}$ of the next higher level grid cell, or 1 minute of latitude and longitude, about 1850 meters north to south.

Each third level city grid cell is then $1/10^{th}$ of the second level grid, or 6 seconds of latitude and longitude, about 185 meters north to south.

Each fourth level city grid cell is then $1/10^{th}$ of the third level grid, about 18.5 meters north to south, around 340 square meters.

Since this fourth level grid corresponds to a resolution some five times more precise than un-aided GPS accuracy (with Selective Availability), a fifth level grid may not be required. Following the same $1/10^{th}$ rule as the higher level grids, a fifth grid cell would measure 1.85 meters on a side, well within the accuracy of differentially-aided GPS.

Cities close to each other can each employ their own city grid even when they overlap. When questions of which city grid occur the city code (or all the higher level codes) can be attached to remove ambiguity.

An example of a use of a ULA might be US.GA.ALB.13 to refer to an area about 20 kilometers wide southwest of the center of Albany Georgia. Then ..ALB.13.78 would refer to an area about 2 kilometers wide near the northeast corner of the previous example. So would .13.78 if the geographic context was established as Albany Georgia.

The code .US.GA.ALB.13.78.27.14 would refer to the smallest unit of about 9 meters within an explicitly defined place. ..78.27.14 would refer to the same place in context.

EXAMPLE 1A

In addition to the example above which demonstrates one means for implementing the city grid, this example describes an alternative means for implementing the city grid based on the Transverse Metcator projection system.

In a preferred implementation a conventional map projection/coordinate system grid is selected. While Lambert Conformal Conic, Stenographic, or local tangent plane system might well be used, in this example, the Transverse Mercator (TM) projection is selected. The TM projection is preferred over other projections suitable for use in local mapping systems because it is most likely an available projection in many GIS and GPS platforms.

To make city centroid selection less contentious an issue, one preferably uses lists of centroids from the Digital Chart of The World (VMapO) or other sources and moves them to arbitrary points that are defined in controlled lists. In order to remove the slight differences in city centroids from different lists, and to standardize the method of fixing the preferred list, the city grids are centered at the nearest 0.05 degrees of latitude and longitude, assuring that the "centroid" is always within the 55 first level cell, and always within about 5.5 km of the center of the grid. This use of decimal degrees rather than values in minutes makes internal computations easier and less subject to complex issues such as repeating fractional values (i.e. 50 minutes= 0.8333333333 . . . degrees).

In this example, the city grids are Transverse Mercator grids with the following characteristics:

Origin latitude and longitude "snapped" to the 0.05 degree increment south-west of the city centroid.

Scale at the origin=1.0

False easting 50,000 meters

False northing 50,000 meters.

Normal TM projection formulas as documented in Snyder (1987) and used in almost everyone's TM routines.

The grid cells for all level grids start at 00 in the south-west corner, increasing to 99 at the north-east corner following this simple pattern:

| 09 | 19 | 29 | 39 | 49 | 59 | 69 | 79 | 89 | 99 |
|----|----|----|----|----|----|----|----|----|----|
| 08 | 18 | 28 | 38 | 48 | 58 | 68 | 78 | 88 | 98 |
| 07 | 17 | 27 | 37 | 47 | 57 | 67 | 77 | 87 | 97 |
| 06 | 16 | 26 | 36 | 46 | 56 | 66 | 76 | 86 | 96 |
| 05 | 15 | 25 | 35 | 45 | 55 | 65 | 75 | 85 | 95 |
| 04 | 14 | 24 | 34 | 44 | 54 | 64 | 74 | 84 | 94 |
| 03 | 13 | 23 | 33 | 43 | 53 | 63 | 73 | 83 | 93 |
| 02 | 12 | 22 | 32 | 42 | 52 | 62 | 72 | 82 | 92 |
| 01 | 11 | 21 | 31 | 41 | 51 | 61 | 71 | 81 | 91 |
| 00 | 10 | 20 | 30 | 40 | 50 | 60 | 70 | 80 | 90 |

Each Level 1 grid cell covers a 10 km by 10 km square region on the ground

Each Level 2 grid cell covers a 1 km by 1 km square

Each Level 3 grid cell covers a 100 meter by 100 meter square

Each Level 4 grid cell covers a 10 meter by 10 meter square

The grid cells are exactly these distances north-south and east-west of the center of the grid.

The scale factor of 1.0 at the grid origin means that largest distance error is less than 4 meters over the extent of the grid.

As an example using the US.DC.WAS grid, the ellipsoidal distance from southwest corner to northeast corner is 141419.494 meters. Computed using the TM grid as though it was orthogonal one would compute a range using the Pythagorean theorem of 141421.356 meters, a difference of 1.862 meters.

These grids then can be used for very accurate distance estimates as well as making there use with any existing map quite simple. In addition, it should be noted that the grid cell designators can be easily computed from the output of any existing TM routine (such as those found in GPS receivers for user grids) using the TM parameters. For instance the position of the Smithsonian Institution in TM eastings and northings is:

52072.6 East and 48736.0 North.

The grid designators are simply extracted from the powers of ten one digit at a time, east followed by north as:

54.28.07.73 for ten meters, or 54.28.07.73.36 for a one meter level grid.

To put a grid designator value into a TM conversion, one makes easting and northing values from the grid designator in the same way.

For instance a random designator of:

39.12.46.15.53, results in: 31415 meters Easting and 92653 meters Northing or 39.12.46, results in: 31400 meters Easting and 92600 meters Northing.

EXAMPLE 2

In addition to the example above which demonstrates the logic and structure of the XYZ.12.34.56.78 format, this example describes the use of a grid format and ULA utilizing the XYZ.12.aa.34.aa format. The Country, State/Province, City and Proprietary Codes remain as described in the previous example, but the optional City Grid is structured differently. The grid code is still initially identified by a pair of numeric characters, and the city grid origin is defined at the ten minute of latitude and ten minute of longitude intersection nearest the city centroid as in the previous example. The definition of each grid and the false casting and northing, as well as the structure of the first grid level, is also as described in the preceding example.

The next lower level of the grid divides each numeric grid into a twenty by twenty grid (400 grid rectangles) area. East is always first, north is always second. The minimum is A from a character set consisting of ABCDEFGHJKLMNPQRSTUV, and the maximum is V. The false casting puts the grid rectangle center at the division between K and L.

The next lower level repeats the numeric code as described in the preceding example dividing each higher grid rectangle into a ten by ten rectangle area, and the next lower level repeats the alpha code described above in this example dividing each higher grid rectangle into a twenty by twenty rectangle area.

If the city grid is the same size as the preceding example, each second level city grid square (represented by the code XYZ.12.aa) is $\frac{1}{20}^{th}$ of the first numeric grid square, 30 seconds of latitude and longitude, or about 920 meters north to south. The third level city grid square (represented by the code XYZ.12.aa.23) would result in a grid rectangle size of approximately 3 seconds of latitude and longitude, or about 92 meters north to south. The fourth level city grid square (represented by the code XYZ.12.aa.23.aa) would be $\frac{1}{20}^{th}$ of the previous city grid square size, resulting in a grid rectangle size of approximately 0.15 seconds of latitude and longitude, or about 5 meters north to south.

It should be appreciated that it is possible to define embodiments in which these higher level portions are defined in terms of either numeric or alpha characters, or alternatively, in terms of mixed alpha and numeric characters.

EXAMPLE 3

This example demonstrates the different precision achievable by varying the size of he city grid of a particular district.

This example uses a sample city grid designator "US.TX.AUS.45.45.77.45," with a district centroid of 30 degrees, 17 minutes north latitude and 97 degrees, 45 minutes of west longitude for an Austin, Tex., city grid district with a district designator, "US. TX. AUS." For a city grid easting and northing resolution of 1 minute of latitude and longitude for the largest resolution grid designator pair, the grid origin would be placed at 30 degrees, 17 minutes north latitude and 97 degrees, 45 minutes west longitude.

For numeric city grid designators with no rotation or scale, and with a false easting and northing of five grid cells, the designator "US.TX.AUS.45.45.77.45" would correspond to a geodetic position of 30 degrees, 15 minute, 45.0 seconds north latitude, and 97 degrees, 45 minutes, 15.0 seconds west longitude. The precision of the smallest grid cell would be one thousandth of a minute of latitude and longitude corresponding to approximately 1.6 meters of easting and 1.9 meters of northing. By reducing the number of designator pairs the precision of the implied geodetic position is also reduced. In this example, a designator of ".TX.AUS.45.45", would refer to an area one tenth of one minute of latitude by one minute of longitude in area or approximately 185 meters north to south; ".AUS.45.45.77" would refer to an area one-hundredth of one minute by one-hundredth of one minute, or approximately 18.5 meters north to south.

Examples of Use

Set forth below are several examples of how the invention can be used. Examples 4 through 7 reflect situations in which the invention may be used and provide marked improvements in function and utility over traditional lat/lon based systems. Example 8 demonstrates certain aspects of the invention related to a particular geographic area and two maps of partially overlapping areas.

EXAMPLE 4

The subject invention may be used for general vehicular navigation, to drive from Los Angeles to the visitor's center at the Grand Canyon. The driver must first determine the address for the target location, and then input the address into the navigational system. There are several alternatives for locating the PLA or ULA. For example, the driver may read travel brochures that contain the ULA/PLA addresses; the driver may also review a map which contains ULA/PLA annotations; or the driver could just call the Visitor's Center and ask them for their PLA or ULA. Alternatively, the driver, using the input device, could search the PLA database to find if the Grand Canyon visitor's center has a PLA. Once the address is determined, the driver enters the PLA or ULA address into a navigational system, and the navigational system will direct the driver to the proper destination.

EXAMPLE 5

Second, the subject invention may be used to direct local traffic to a particular point of interest. For example, if the driver above is traveling along a highway and becomes hungry and desires to eat at a particular fast-food chain, the driver could interrogate the system data to find any nearby chain restaurants. The driver simply queries the system for occurrences of the fast-food chain's PLA, and, since the system is aware of its current location, the chain's restaurants may be listed by proximity. The driver simply selects one of the restaurants, and the navigational system directs the driver to that location. Additionally, a local restaurant may advertise a ULA or PLA for its location, so a driver, seeing a billboard or advertisement containing a ULA or PLA address, could input that address and be directed to the restaurant location. Because of the unique style of the addresses and features of the subject invention, these addresses are particularly easy to input with a minimum chance of error, decreasing the risk of accidents and increasing the likelihood of going to the desired location.

EXAMPLE 6

Third, the subject invention is particularly well suited for customization by individual or team users, facilitating intra-group communication and navigation. For example, if a group of hikers desires to split up and explore a particular area, they each could set their portable navigation devices to reference a custom grid with an appropriate grid size and location for the explorable area that allows sufficient resolution with a minimum number of digits or characters. Now, as the hikers communicate with each other or record interesting locational information, the data may be easily and accurately used and referenced to a meaningful location. This ability to set a user-defined reference point and grid size would also be useful for rescue teams performing search and rescue operations by allowing the search and rescue team to instantly establish a grid size and location for any search.

EXAMPLE 7

Fourth, the subject invention has emergency utility. For example, if a hiker above needs emergency assistance, the navigational system can provide a locational ULA that is easy to read and communicate by voice or numeric only key pad, which reduces both the ambiguity, risk and time involved in describing an emergency location. Alternatively, this ULA may be automatically communicated to emergency personnel if the navigational system integrates with a portable phone, two way pager, or other portable communication device.

EXAMPLE 8

Figure 6:
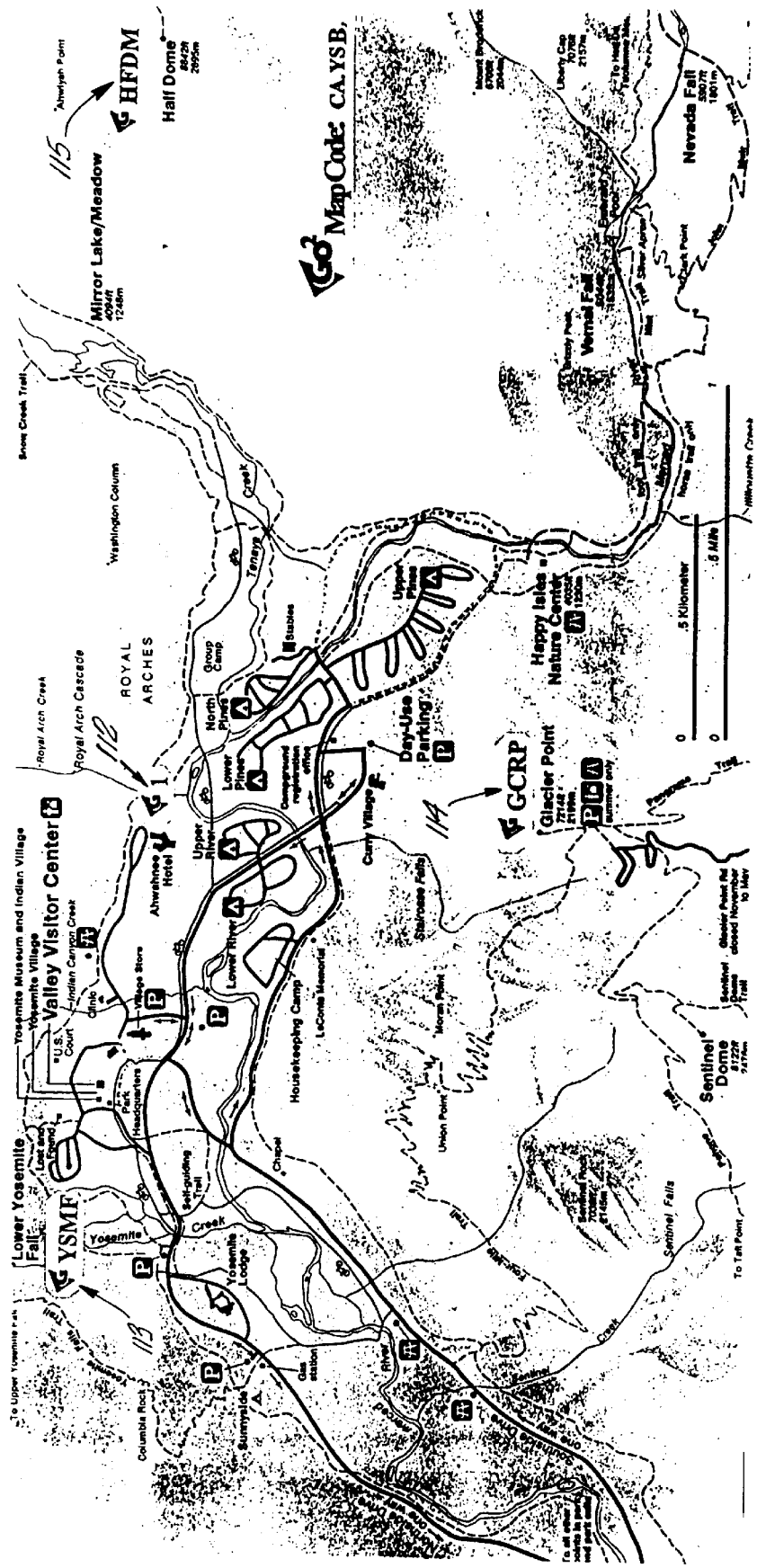
FIGS. 6 and 7 show the use of PLAs and ULAs in a specific geographical context.

An example illustrating the use of PLAs and ULAs in a specific geographical context, Yosemite National Park, will now be described. FIG. 6 illustrates a paper map with an assigned name of CA.YSB (indicated by identifying numeral 111). Within the boundaries represented on this map, the following PLAs have been reserved:

| PLA numeral | Description of Location | Corresponding FIG. 6 identifying |
|---|---|---|
| HFDM | Half Dome | 115 |
| 1 | Ahwahnee Hotel | 112 |
| GCRP | Glacier Point | 114 |
| YSMF | Lower Yosemite Fall | 113 |

Figure 7:

FIG. 7 illustrates a district with an assigned name of CA.YSM (indicated by identifying numeral 120). Within this district, the following PLAs have been reserved:

| PLA numeral | Description of Location | Corresponding FIG. 7 identifying |
|---|---|---|
| HCHY | Hetch Hetchy | 121 |
| 11 | White Wolf | 122 |

-continued

| PLA numeral | Description of Location | Corresponding FIG. 7 identifying |
|---|---|---|
| NENT | Big Oak Flat Entrance | 123 |
| GCRP | Glacier Point | 126 |
| WENT | Arch Rock Entrance | 124 |
| BDGP | Badger Pass | 125 |
| 1 | Wawona Information Center | 128 |
| SENT | South Entrance | 127 |

The following points should be noted from this example:

First, the name CA.YSB is for the specific map included in FIG. 6, and not for a district in which all of the area contained on the map is included. This feature allows assignment of specific PLA's for specific maps without regard to the district, thereby providing clarity in situations where the area covered by the map overlaps one or more districts.

Second, the name CA.YSM is the name of the district in which the area included in the map in FIG. 7 is located, thereby allowing areas included within this map to be referenced by either PLAs (e.g. CA.YSM.HCHY) or ULAs (e.g. CA.YSM.32.84.23.43) without the need to re-identify the name of the district or map.

Third, the areas covered by the CA.YSM district and the CA.YSB map overlap, allowing PLA references to either the YSM district or the YSB map. (Note also that the system might also define YSB as a district which could be utilized in determining ULA's with reference to the YSB district, in which case the YSB and YSM districts would also partially overlap.)

Fourth, the PLA's for particular locations may either be identical except for the district name (e.g. GCRP in FIG. 6 and GCRP in FIG. 7 refer to the same location) or identical PLA's may apply to different locations in different districts or on different maps (e.g. "1" in FIG. 6 and "1" in FIG. 7 refer to different locations on each of the respective maps). This is consistent with the principle that a PLA need only be unique within the district in which it is defined.

All of the features described in this example are designed to allow an initial manual or electronic input (either a district code, cell code, or specific map code) which allows users to use PLA's or ULA's identified on a specific map with a minimum number of keystrokes, thereby minimizing data entry, confusion, and ambiguity.

Examples of Software Implementation

Examples 9, 10, and 11 demonstrate certain characteristics of files, pseudo-codes, and program screens of particular embodiments of the invention. (Note that the data contained in the files is provided for illustrative purposes only).

EXAMPLE 9

In this example, formats of specific files that are used in one implementation of the subject invention are described. Four files are described: GO2CITY.DAT, STATES.DAT, PROPGO2.DAT, and COUNTRYS.DAT.

The GO2CITY2.DAT file, illustrated in FIGS. 8a–8b, defines the reference points for a plurality of pre-defined districts centered around specific cities. For each reference point, there is provided the name of the district, the name of the reference point, and the global coordinates of the reference point. Thus, the first entry of this file "AK, ANC, Anchorage, 149W54, 61N13," indicates that there is a district in the state of Alaska centered around Anchorage, with the reference point thereof having the following global coordinates: 149W54,61N13.

The STATES.DAT file, illustrated in FIG. 9, simply defines the mnemonics used in GO2CITY2.DAT to define states.

The PROPGO2.DAT file, illustrated in FIGS. 10a–10c, defines the proprietary names which have been reserved for each district. This file correlates each such proprietary name with the global coordinates associated with that name. Thus, the first entry of this file, "US.CA.NWB.MAC2, 117W52.360, 33N39.549" indicates that, in a district centered around Newport Beach, Calif., there is a MacDonalds having the following global lat/lon coordinates address: 117W52.360, 33N39.549.

The COUNTRYS.DAT file, illustrated in FIG. 11, simply defines the country mnemonics used in PROPGO2.DAT.

EXAMPLE 10

Figure 12A:
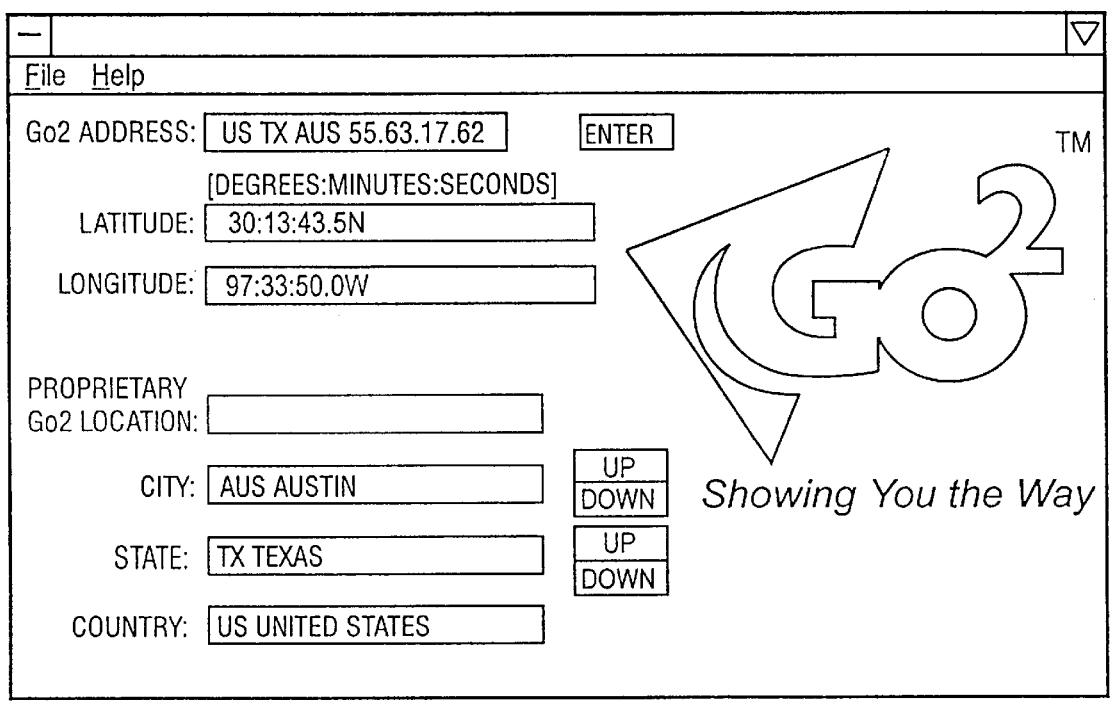
FIGS. 12a–12c are examples of screen outputs used in one implementation of the object invention.
Figure 12B:
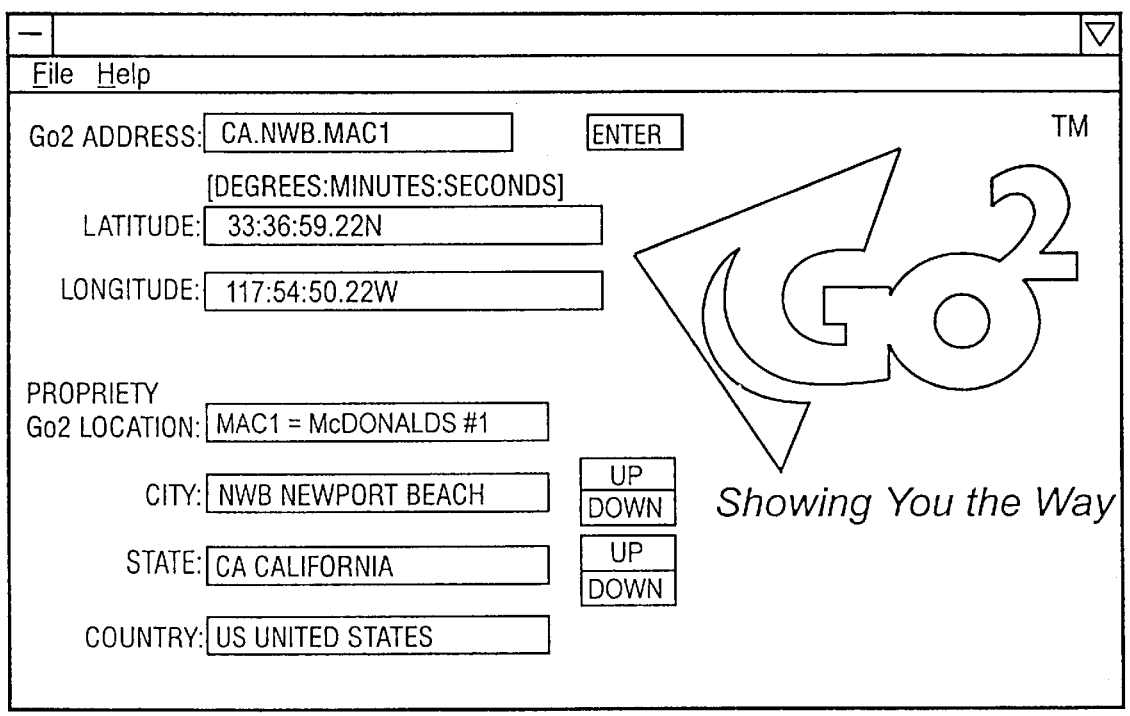
Figure 12C:
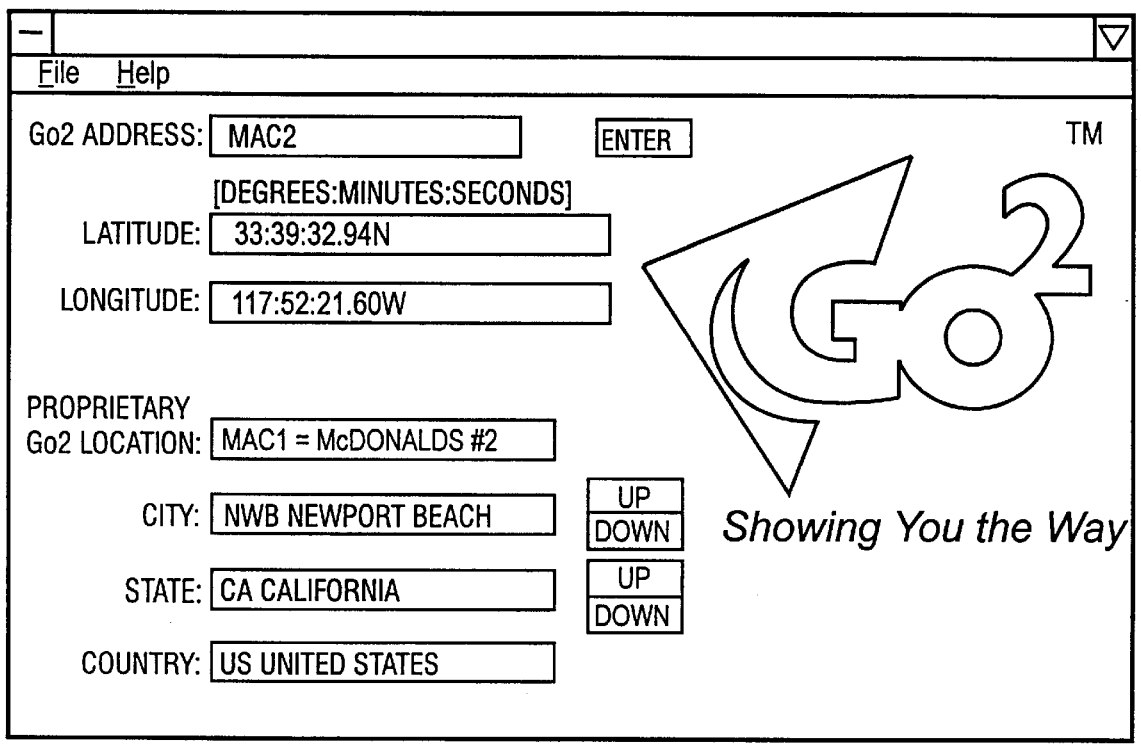

This example illustrates screen formats as displayed on an output device in an implementation of the subject invention. FIG. 12a is a screen illustrating the input of a ULA or grid address into a navigational system, with the system determining and outputting corresponding latitude and longitude coordinates. FIG. 12b illustrates the input of a PLA, with the system determining and outputting corresponding latitude and longitude coordinates. FIG. 12c illustrates the capability of the system to interpret the context, i.e. district address, of previous addresses, and to assume that the same distinct addresses applies to subsequent specific addresses until notified otherwise. In this specific example, the proprietary name MAC2 was input, with the system assuming that the district name associated with the previous example relating to MAC1, i.e., the CA.NWB. district name, applied to this example as well. Thus, in FIG. 12c, only the identifier "MAC2" need be input to the system, it being assumed that the district identifier "CA.NWB" applies to this request as well.

EXAMPLE 11

This document is a functional description of a computer program, Go2Grid, which embodies one or more aspects of the subject invention. The program is written in the "C++" programming language and its purpose is to demonstrate the feasibility of conversion between city grid and proprietary codes and geodetic coordinates.

Program flow is described using a series of pseudo-code statements. The functions required to perform these tasks are described. The data variable types and structures are defined. The parameters required for implementation of two possible city grid designators are defined.

Program Flow

Set all defined parameters to their default values
Northern latitudes are positive
Eastern longitudes are negative
The assumed geodetic datum is World Geodetic System 1984 (WGS-84)
The last geodetic position is used to initialize the City Grid designator.
The user screen is initialized
Monitor keystrokes or navigation receiver input
For any City Grid designator change
Parse user input If change in City Code
   Compute city position from designator
   Fill City Code
   Fill Country and State Codes
If change in State Code
   Fill Country and State Codes
If change in Country Code
   Fill Country Code
If change in entire City Grid Designator
   If a Universal Go2 Code
     Fill Country, State, City and Grid Codes
   If a Proprietary Go2 Code
     Fill Proprietary Code
Compute geodetic coordinates for this Go2 Designator
For any change in geodetic coordinates
Parse user input
If user has requested a Universal Code
   If current geographic context is changed
     Get Go2 Codes from latitude and longitude
       Find closest city
       Set new City Grid center
       Fill Country, State, City codes
   Compute City Grid Codes for each level of precision
Reset User Screen display
Continue

Functions

The following functions are used by the Go2Grid sample program, an embodiment of the city grid concept:

| Function | Description |
|---|---|
| getdeg() | extracts decimal degrees from character strings |
| grange() | computes geodetic range between two positions |
| dmsdeg() | extracts degrees, minutes, seconds from decimal degrees |
| degdms() | forms decimal degrees from degrees, minutes, seconds |
| getcenter() | computes geodetic coordinates of City Grid center from city centroid |
| getgrid() | computes City Grid codes for level of precision |
| getkeys() | parses user keyboard input |
| parsego2() | parses Go2 City Grid designator |
| addlatlon() | concatenates next level of precision onto geodetic coordinates |
| getnextcity() | finds next city in current state/province list |
| getprevcity() | find previous city in current state/province list |
| getcost() | fills Go2 City Grid designator with country and state/province codes |
| putscreen() | fills display with current city Grid designator and geodetic coordinates |
| getnextstate() | finds next state/province in current country list |
| getprevstate() | find previous state/province in current country list |

Types and Structures

The Go2Grid embodiment sample program defines the following variable structures in addition to the usual character, integer, float, and double types:

```
typedef struct cCstruct {
char city_code[4];
char city[60];
char state_code[3];
char state[60];
char country_code[3];
char country[60];
char longitude[32];
char latitude[32];
double tat;
double Ion;
double centerlat;
double centerlon; };
typedef struct latlonstruct {
int latdeg;
int latmin;
int latsec;
int londeg;
int lonmin;
int lonsec;
};
```

Program Definitions
The following definitions are used within the Go2Grid sample program:

```
/* grid types */
/* a grid= = type 1 is numeric with 10 minutes, 1.0, 0.1,
   and 0.001 grids */
/* a gridtype= = 2 is alphanumeric with 10, 0.5, 0.05 and
   0.0025 grids */
#define GRIDTYPE 1
#define TITLE "Go2 and Geographic Coordinate Converter"
#define VERSION "(4/3/96)"
/* lines */
#define TITLELINE 1
#define GO2CONTEXTLINE 5
#define GEOCONTEXTLINE 10
#define HELPLINE 15
#define MESSAGELINE 18
#define COUNTRYLINE 20
#define STATELINE 21
#define CITYLINE 22
#define GO2LINE 23
#define LATLINE 24
#define LONLINE 25
#define INCOL 23
#define OUTCOL 5
#if GRID TYPE= = 1
/* GRID GRAIN */
#define GRIDKIND "Numeric City Grid"
#define GRIDDEF "Grid Precision: Level 1=1.0'; Level
   2=1.0'; Level 3=0.1'; Level 4=0.01'"
#define GRIDCHARS "Designators Levels 1, 2, 3 and 4:
   [01232456789]"
#define LEVEL 1_EGRAIN 10.0
#define LEVEL 1_NGRAIN 10.0
#define LEVEL 1_ECHRS "0123456789"
#define LEVEL 1_NCHARS "0123456789"
#define LEVEL 1_EGRIDS 10
#define LEVEL 1_NGRIDS 10
#define LEVEL 2_EGRAIN 1.0
#define LEVEL 2_NGRAIN 1.0
#define LEVEL 2_ECHARS "0123456789"
#define LEVEL 2_NCHARS "0123456789"
#define LEVEL 2_EGRIDS 10
#define LEVEL 2_NGRIDS 10
#define LEVEL 3_EGRAIN 1.0
```

```
#define LEVEL 3_NGRAIN 0.10
#define LEVEL 3_ECHARS "0123456789"
#define LEVEL 3_NCHARS "0123456789"
#define LEVEL 3_EGRIDS 10
#define LEVEL 3_NGRIDS 10
#define LEVEL 4_EGRAIN 0.010
#define LEVEL 4_NGRAIN 0.010
#define LEVEL 4_ECHARS "0123456789"
#define LEVEL 4_NCHARS "0123456789"
#define LEVEL 4_EGRIDS 10
#define LEVEL 4_NGRIDS 10
#else if GRIDTYPE= = 2
#define GRIDKIND "Alphanumeric City Grid"
#define GRIDDEF "Grid Precision: Level 1=10'; Level
    2=0.5'; Level 3=0.05'; Level 4=0.0025'"
#define GRIDCHARS; "Designators Levels 1&
    3:[01232456789];    Levels    2&    4:
    [ABCDEFGHJKLMNPR,TLVW]"
/* GRID GRAIN */
#define LEVEL 1_EGRAIN 10.0
#define LEVEL 1_NGRAIN 10.0
#define LEVEL 1_ECHARS "0123456789"
#define LEVEL 1_NCHARS "0123456789"
#define LEVEL 1_EGRIDS 10
#define LEVEL 1_NGRIDS 10
#define LEVEL 2_ECRAIN 0.5
#define LEVEL 2_NGRAIN 0.5
#define LEVEL 2_ECHARS "ABCDEFGHJKLMN-
    PRSTUVW"
#define LEVEL 2_NCHARS "ABCDEFGHJKLMN-
    PRSTUVW"
#define LEVEL 2_EGRIDS 20
#define LEVEL 2_NGRIDS 20
#define LEVEL 3_EGRAIN 0.05
#define LEVEL 3_NGRAIN 0.05
#define LEVEL 3_ECHARS "0123456789"
#define LEVEL 3_NCHARS "0123456789"
#define LEVEL 3_EGRIDS 10
#define LEVEL 3_NCRIDS 10
#define LEVEL 4_EGRAIN 0.0025
#define LEVEL 4_NGRAIN 0.0025
#define LEVEL 4_ECHARS "ABCDEFGHJKLMN-
    PRSTLVW"
#define LEVEL 4_NCHARS "ABCDEFGHJKLMN-
    PRSTUVW"
#define LEVEL 4_EGRIDS 20
#define LEVEL 4_NGRIDS 20
#endif
```

DESCRIPTION OF PREFERRED EMBODIMENTS OF THE INTERNET BASED AUTOMATIC LOCATION SYSTEM

FIGS. 13–22 are used to describe a preferred embodiment of an automatic location system using the geographical referencing system described above. For purposes of the remainder of this specification, the geographical referencing system described above in FIGS. 1–12, is hereinafter referred to as the "Go2 grid" coordinate or referencing system. It should be noted that although this aspect of the present invention could be implemented with other types of geographical referencing Systems, it is preferably implemented with the Go2 grid system to take advantage of the features described herein.

Figure 13:
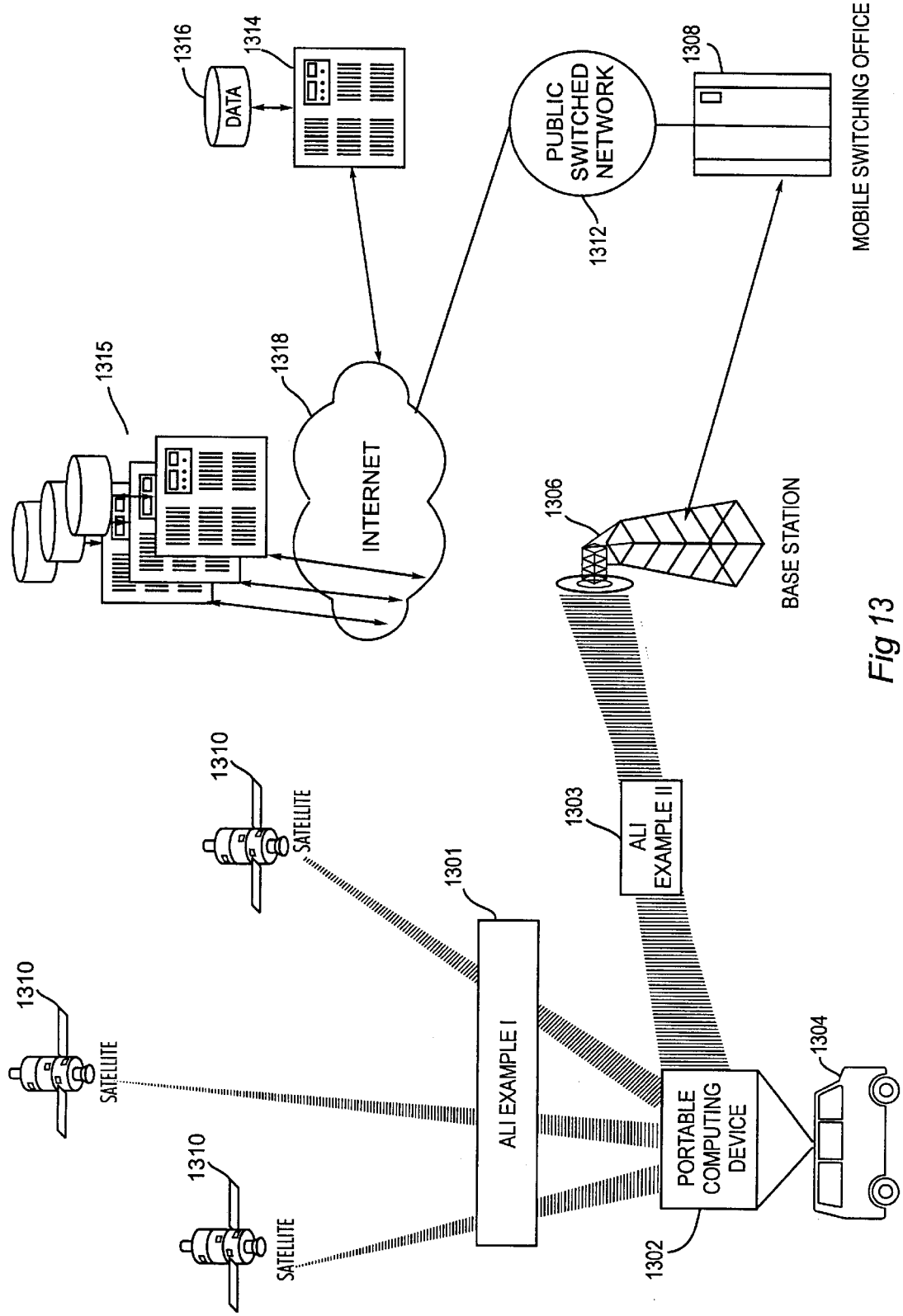
FIG. 13 depicts an operational environment of the automatic location aspect of the present according to a preferred embodiment.

FIG. 13 depicts an operational environment of the automatic location aspect of the present according to a preferred embodiment. A portable-computing device 1302 is installed in a mobile unit such as an automobile 104. Alternatively, the portable-computing device 1302 may be carried on the person of individual users. In yet another embodiment, the present invention can be implemented using a non-portable computing device such as a general-purpose desktop computer or the like.

However, for the purposes of this example, the device 1302 is referred to as the portable-computing device. In one embodiment, the portable-computing device 1302 receives data from Global Positioning System (GPS) satellites 1310 for location identifying purposes. This is ore example of a means for automatic location identification, as shown by block 1301 labeled "ALI Example 1." A second example of a means for automatic location identification is shown as block 1303 labeled "ALI Example II." ALI Example II 1303 is intended to represent a means for automatically identifying the location of a device, such as device 1302, via a cellular transmission. Example II 1303 typically uses triangulation techniques in conjunction with at least two cellular base stations, or distance measuring techniques from three cellular base stations, such as the base station 1306.

Additional means for ALI can also be used in alternate embodiments of the present invention. For example, the automatic identification signals commonly used in land-line telephonic devices ("ANI" and the like), can be used in conjunction with a database lookup table to identify a callers fixed location.

In any case, any well-known means for automatically identifying a caller's geographical location can be used in various embodiments of the present invention. In fact, future methods, not yet known, but used for identifying the location of a mobile unit, such as the mobile unit 1302, are within the scope of the present invention. Accordingly, the use of the examples of a cellular network and a GPS system should not be construed to limit the scope and breadth of the present invention.

The portable-computing device 1302 has the capability for wireless communications. In this example, one use of the wireless communication feature is to connect the portable-computing device 1302 with a computer network, such as the Internet 1318. The wireless communication feature of the present invention is also used for providing standard telephony functions. In addition, as stated above, the wireless communication feature of the present invention can also be used to implement ALI functionality in accordance with the principals described herein.

In one example, cellular technology is used to implement the wireless communication feature of the present invention. In FIG. 13, the base station 1306 and the mobile switching office 1308 represents a portion of a typical cellular network. The base station 1306 sends and receives radio signals to and from the portable-computing device 1302. The mobile switching office 1308 is coupled to the base station 1306 via standard telecommunication transmission lines. Likewise, the mobile switching office 1308 is coupled to the public switched telephone network 1312 via standard telecommunication transmission lines. The public switched network 1312 is coupled to the Internet 1318 via a point-of-presence, which is typically implemented using high bandwidth T3 telecommunication channels or the like.

A primary server 1314 is coupled to the Internet 1318. The primary server 1314 is used to interface with the portable-computing device 1302 as described below. The primary server 1314 is coupled with a database or persistent storage device 1316. A plurality of enhanced servers 1315 are connected to the Internet 1318. The enhanced servers 1315 provide location specific data to the portable-computing device 1302. The primary server 1314 selects a particular enhanced server 1315 to be connected to the portable-computing device 1302 in accordance with a database query as described below.

Note that the present invention is described in terms of a primary server 1314 and one or more enhanced servers 1315. However, this does not mean that separate physical servers must be used to implement these functions. Indeed, a single server or multiple servers can be used to implement the functions of the primary server 1314 and the enhanced servers 1315 as described herein. Thus, the use of these terms should not be construed to limit the scope and breadth of the present invention to the physical configurations described in these exemplary embodiments.

The cellular network is just one example of a technology that can be used to implement the wireless communication feature of the present invention. In other embodiments, different types of wireless technology can be used, such as low orbit or geosynchronous orbit satellite communications. In fact, any type of wireless technology can be used to provide the wireless communication feature of the present invention.

Further, the Internet 1318 is used in a preferred embodiment of the present invention due to its wide use and availability. However, any type of computer network can be used in alternate embodiments of the present invention. As such, the use of the examples of a cellular network and the Internet 1318 should not be construed to limit the scope and breadth of the present invention.

Figure 14:
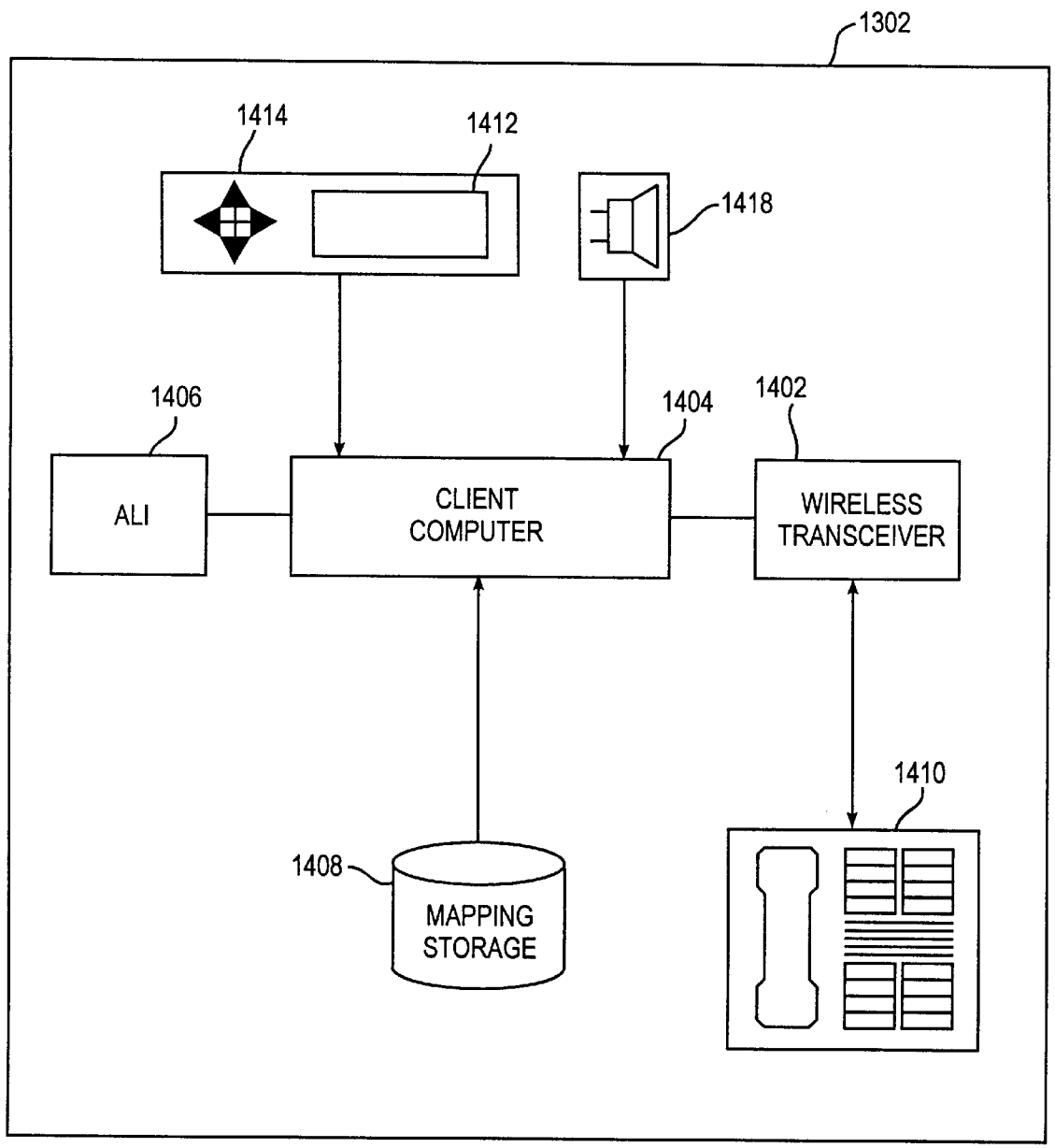
FIG. 14 is a block diagram depicting details of the portable-computing device in accordance with the subject invention.

Details of the portable-computing device 1302 are depicted in FIG. 14. Typically, the portable-computing device 1302 comprises a client computer 1404, a persistent storage device or database 1408, a display screen 1412, a keypad input device 1414, a speech interface 1418, an ALI device 1406, a wireless transceiver 1402 and a telephony device 1410.

Note that these components, such as the ALI device 1406 and/or the wireless transceiver 1402 may be imbedded within the portable-computing device 1302. Alternatively, such components may be implemented as discrete external devices coupled to the portable-computing device 1302 through external ports, such as RS-232, SCSI, USB ports or the like.

In addition, many of the components described above are optional and depend on each specific implementation of the present invention. For example, the speech interface 1418 and the ALI device 1406 are optional components. Embodiments of the present invention that operate without an ALI 1406 accept manual input of location information via the keypad 1414 or other input device.

Any type of general or special purpose computer system can be used to implement the portable-computing device 1302. Examples of such devices include standard laptop computers, automobile computers and personal digital assistant devices (PDAs). Typically the portable-computing device 1302 includes a CPU, local working memory, or RAM, non-volatile program memory, or ROM, and some form of non-volatile external memory for data storage 1408 such as any type of NVRAM, or magnetic or optical disk storage systems. An example of a general-purpose computer system that can be used to implement the present invention is described below with reference to FIG. 22.

The display screen 1412 is used to display output from the portable-computing device 1302. The keypad device 1414 is coupled to the portable-computing device 1302 and is used for inputting data. For example, location data can be manually input from the keypad device 1414.

In this example, a speech interface 1418 is also coupled to the portable-computing device 1302. The speech interface 1418 uses voice recognition techniques to accept spoken commands from users for controlling the portable-computing device 1302. The speech interface 1418 is used in a preferred embodiment to allow users to control the computer 1404 via spoken voice commands for promoting safe driving conditions while operating the portable-computing device 1302 from an automobile or the like.

The persistent storage device 1408 is used to store application programs such as a web browser and one or more specialized application programs used to implement the present invention as described in detail below. Such application program(s) is/are referred to herein as the "Go2 Application program," which is described in detail below. In addition, location and other information are stored as data packets on the local persistent storage device 1408, as described in detail below. Depending on the storage capacity of the persistent storage device 1408, one or more database lookup tables can be stored therein and used for translating, for example, between a lat/lon coordinate system and the Go2 grid coordinate system. However, all systems that are enabled in accordance with the present invention will generally have the capability to translate between a lat/lon coordinate system and the Go2 grid system using the universal addressing scheme as described above. Additional storage requirements are needed to translate to and from the Go2 grid system using proprietary addresses.

The wireless transceiver 1402 is used to send and receive data between the portable-computing device 1302 and other devices such as the servers 1314 and 1315 coupled to the Internet 1318.

The ALI device 1406 is used to track the position, and possibly the speed and bearing of the portable-computing device 1302. As stated above, any device can be used that performs ALI functionality. Examples of well-known ALI devices are GPS systems, low orbit satellite systems, geosynchronous orbit satellite systems, telephone number identification systems, cellular network triangulation methods, etc. In this example, telephone number identification systems (ANI) can be used in conjunction with a database lookup table to determine predefined fixed positions of users based on an assigned telephone number.

Figure 15:
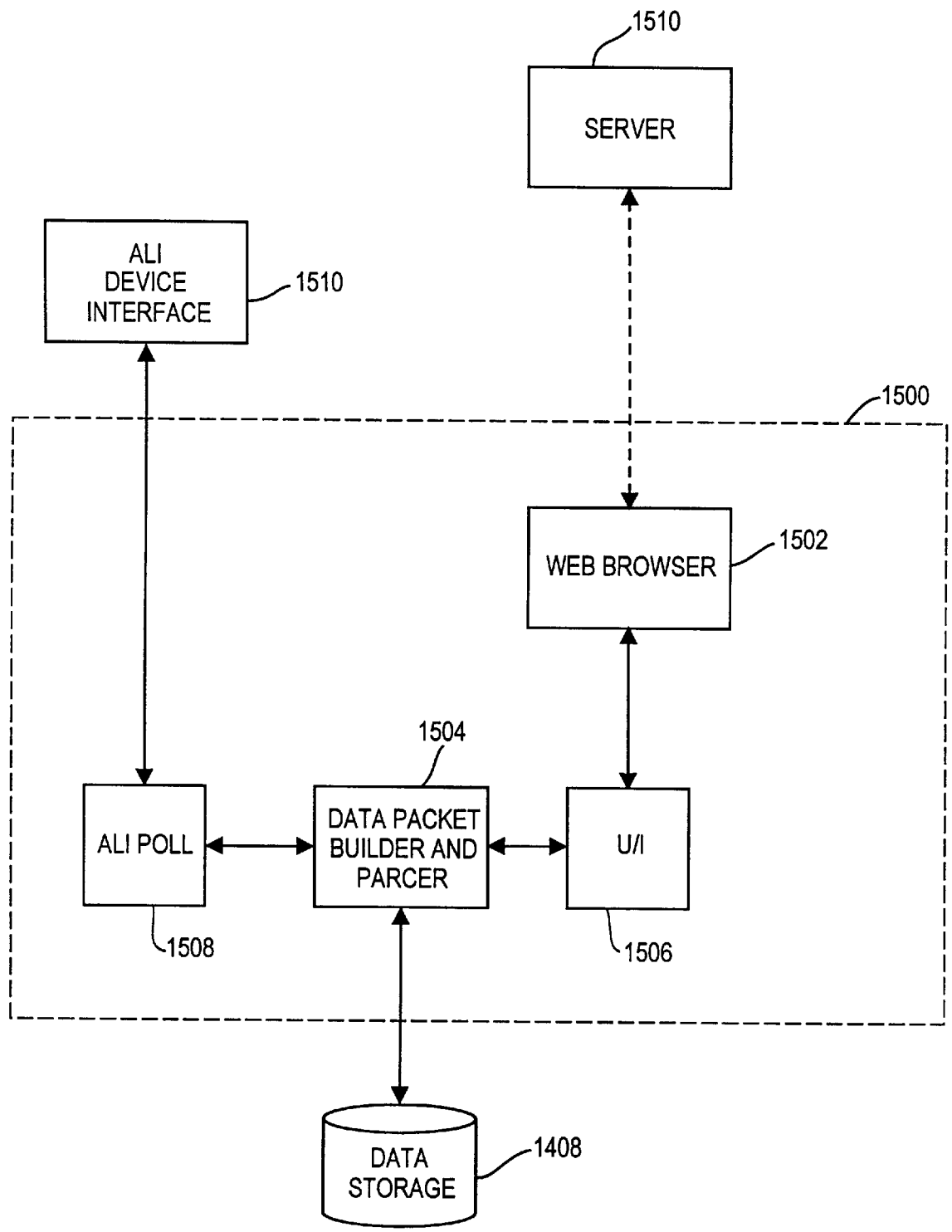
FIG. 15 is a block diagram depicting functional components of an application program or program(s) running on the portable-computing device in accordance with an embodiment of the present invention.

FIG. 15 is a block diagram depicting functional components of an application program or program(s) running on the portable-computing device 1302 in accordance with an embodiment of the present invention. As stated, the application program(s) is/are referred to herein as the "Go2 application program" 1500.

The Go2 Application program 1500 is provided with a web browser component 1502. The web browser component 1502 is used to perform web browser functions for the portable-computing device 1302. In fact, in one embodiment, a standard web browser is used to implement the web browser component 1502 of the present invention. Alternatively, customized web browser code can be imbedded into the Go2 Application program 1500. In either case, the web browser module 1502 provides standard web browser functions. Such functions would be apparent to persons skilled in the relevant art(s). As shown, the web browser component 1502 is coupled to a web server 1510.

Accordingly, the web browser module 1502 interprets data streams sent from the server 1510 and displays text and/or graphics therefrom. The text and/or graphics are displayed on the display screen 1412. The web browser component 1502 also accepts input from users via the keypad 1414 or other input devices. Preferably, the data streams transmitted by the server 1510 are in a standard format, such as HTML, a modified version of HTML or the like. In this fashion, generic web-browsing tools can be used to interface with the web server 1510 and the U/I module 1506 (see below) of the present invention.

The User Interface (U/I) module 1506 is coupled with the web browser module 1502. The U/I module 1506 is used to prompt the user for information including user preferences and category selections to be used for subsequent information requests, (i.e. on-line database queries) as described below. The U/I module 1506 preferably performs at least some functions locally. That is, at least some functions provided by the U/I module 1506 are performed without a live connection to the server 1510. These functions are referred to herein as "local functions" and are described in detail below. For example, one local function provides a menu that is displayed which allows users to select from a list of predefined categories. In this example, users select a category of interest for formulating a database query that is to be used in a subsequent on-line session with the primary server 1314. Details of this aspect of the present invention are described below.

A data packet builder and parser module 1504 (hereinafter "data packet module") is coupled to the U/I module 1506. The data packet module 1504 is used to construct data packets, which are stored on the local storage device 1408. These data packets are subsequently read by the server 1510 and used to formulate on-line database queries. The data packet module also parses data packets received from the server 1510. Details and examples of data packet contents are described below.

An ALI polling module 1508 is used to poll the ALI device module 1510. The ALI device 1406 provides location, bearing and speed information to the Go2 Application program 1500. This information is then used to build data packets that are stored in the local data storage device 1408. Details of a process that can be used to implement the ALI polling module 1508 is described below.

Figure 16:
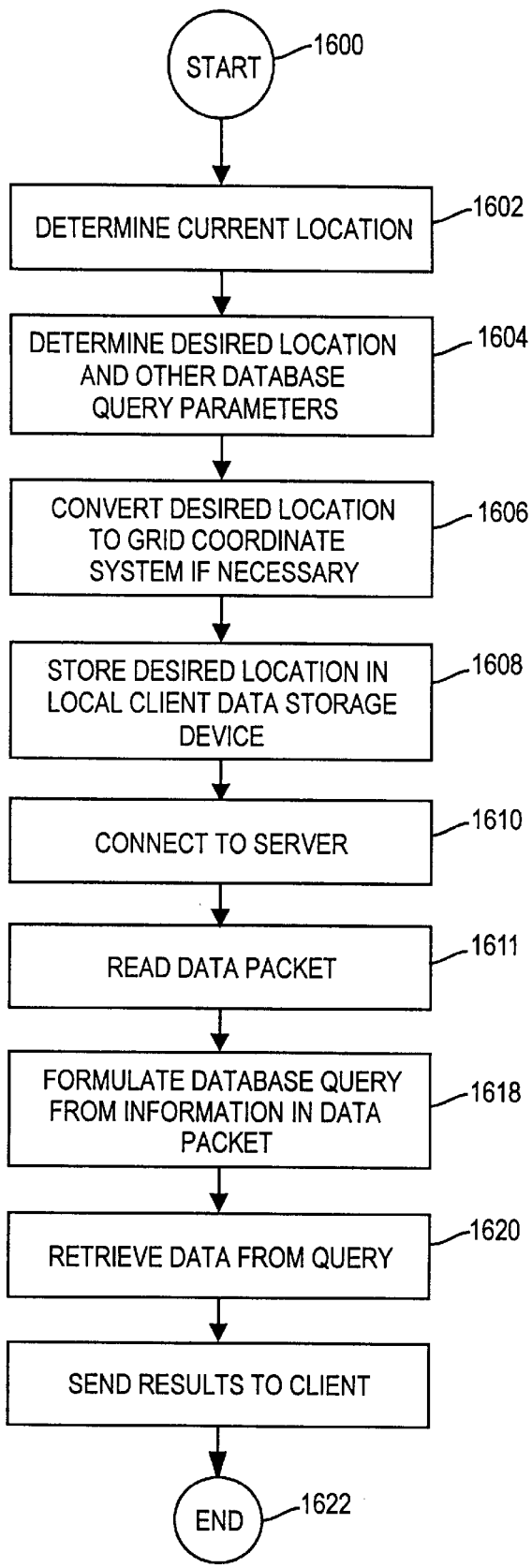
FIG. 16 is a flowchart that generally describes an overall process in accordance with an embodiment of the present invention.

FIG. 16 is a flowchart that generally describes an overall process in accordance with an embodiment of the present invention. The process begins with step 1602. In step 1602 the process determines the current location. The current location can be automatically determined from an ALI device 1406, or can be manually input from the user. After the current location is determined, control passes to step 1604.

Next, in step 1604, the process determines the desired location and specific database query. The U/I module 1506 may be used to present the user with one or more selectable menu choices. Attentively, in one embodiment, the U/I module recognizes numerous requests based on commonly used terms such as "burgers," "shopping," "banks," or the like. In this fashion, the user can formulate a complex database query by simply picking and choosing among the menu items presented or the user may perform a simple database query by merely inputting one or more common terms.

For example, the user may wish to formulate a database query for finding all fast-food restaurants within a five-mile radius. The desired location may be different from the current location, if for example, the user specifies some time in the future. For example, the user may wish to find fast-food restaurants within five-mile radius from a location one hour in the future. In this example, the process call use the current location, current speed and bearing to predict the desired location. In another example, a routing program can be used to determine the desired location based on a pre-defined route input by the user.

Next, in step 1606, the desired location is converted to the Go2 grid coordinate system, if necessary. For example, GPS devices typically use the geodetic latitude and longitude system for describing location data. In this case it may be necessary to convert to the Go2 grid coordinate system in order to take advantage of the unique features of the referencing system as described herein.

In another example, a user may manually input location information. Again, such manual input is preferably entered in the Go2 grid coordinate format because of its ease of use lower susceptibility to errors. If Go2 data is entered directly, either manually or by the ALI device 1406, then step 1606 is bypassed.

Next, in step 1608 the current location information and the database query information is stored in the local storage device 1408. Typically, this information is stored in a pre-defined data format referred to herein as a "data packet." The format of a typical data packet is described below. Next, in step 1610, the portable-computing device 1302 connects to the primary server 1314.

In step 1611, the primary server 1314 reads the data packet stored in step 1608. From this information, a database query is formed as indicated by step 1618. Next, in step 1620, the process retrieves the results from the database query and sends them to the client, as indicated by step 1620. The process ends with step 1622.

Figure 17:
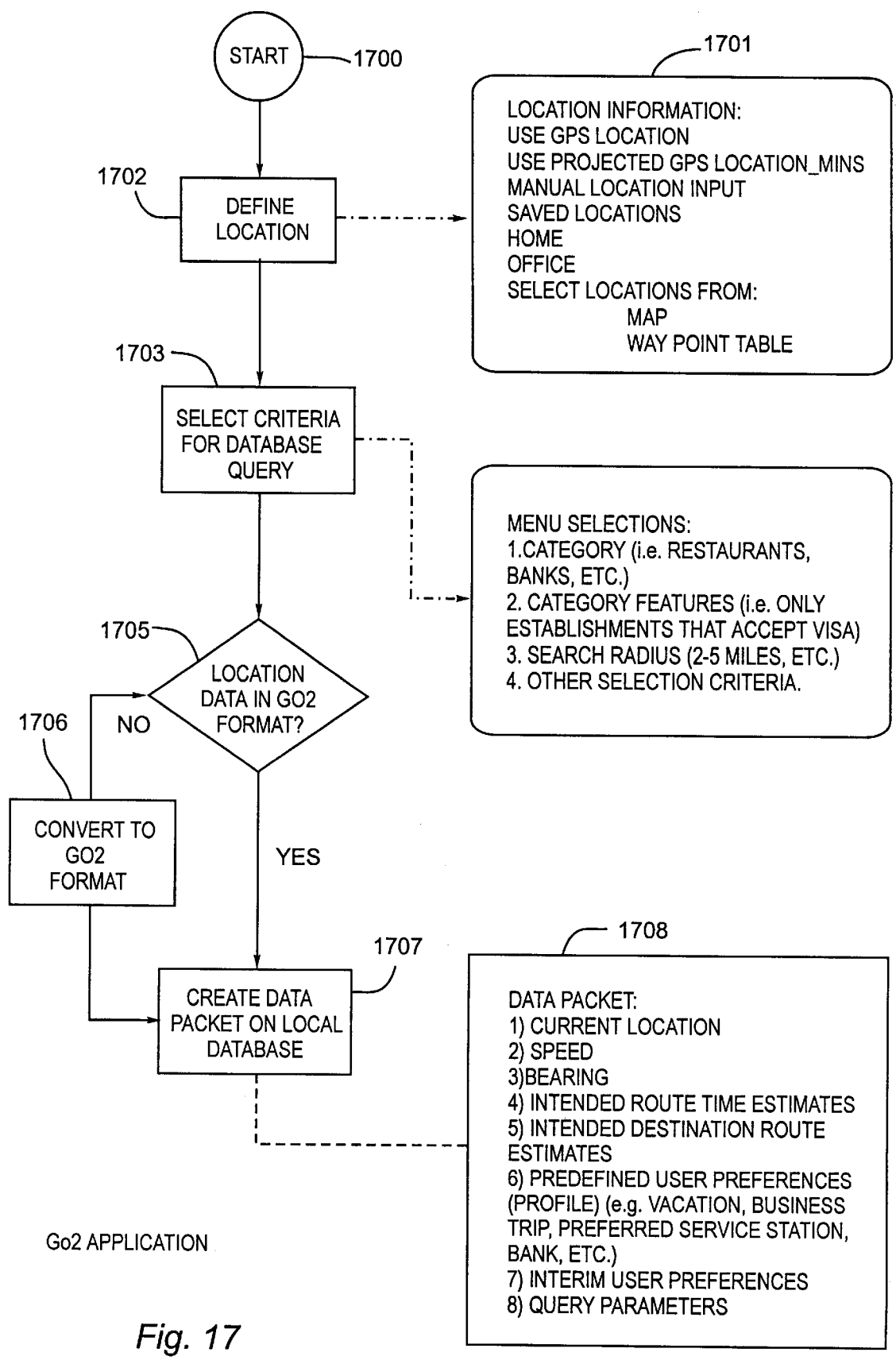
FIG. 17 is a flowchart depicting a process that can be used to implement a portion of the Go2 Application program according to an embodiment of the present invention.

FIG. 17 is a flowchart depicting a process that can be used to implement a portion of the Go2 Application software 1502. The process begins with step 1702. In step 1702, the U/I module 1506 offers the user one or more options for specifying how location information is to be determined. Typically, if an ALI device is attached, it is used to automatically provide location information to the Go2 Application software 1500. Alternatively, one or more additional methods for specifying location information are typically offered. In this example, as indicated by the block 1701, the user has the option to specify that the process retrieve location information from the attached GPS receiver. In one example, the user can select between the current GPS location and a projected location based on a specified elapsed time.

In addition, predefined locations, such as home or office can be specified. Typically, the location coordinates are preprogrammed as a user preference. In a preferred embodiment, the Go2 grid coordinate system is used to specify such pre-programmed user preferences. Alternatively, in this example, the user can access a map in which to specify a location. The map database can either be provided locally by the client 1404, or can be provided remotely through a connection with a server 1510.

In another example, a routing program (either on-line or locally) can be used to project future locations and to specify one or more waypoints along a pre-defined route. In addition the user has the option to manually specify location information. Advantageously, manual input is in the form of the Go2 coordinate system.

It should be noted that block 1701 lists a few examples of the types of parameters that can be specified by users for determining location information in accordance with a preferred embodiment of the present invention. Alternate embodiments may comprise selections that are very different from the examples provided herein. The actual contents of menu items displayed by the U/I module 1506 depend on each specific implementation of the present invention. As such, the examples used herein should not be construed to limit the scope and breadth of the present invention.

In any case, once location information is specified in step 1702, control passes to step 1703. In step 1703 the U/I module 1506 prompts the user for criteria used to formulate a subsequent on-line database query. In this example, the user selects a category of interest, one or more category features, a search radius and other selection criteria. One method that can be used to implement this step is to display a selectable menu to the user as shown in block 1704. The U/I module 1506 is used to perform this function.

For example, the menu 1704 comprises category selections such as: restaurants; banks; ATM machines; hotels:, copy centers; libraries; museums; gas stations; weather reports; car dealers; auto repair shops; maps; directory assistance; police stations; hospitals and the like. In this fashion, for example, the user can find nearby restaurants by first selecting the corresponding category of interest, as shown in block 1704.

In addition, the menu shown in block 1704 allows users to specify one or more features associated with the selected category. Feature selections narrow or drill-down the subsequent database search. For example, the user may only be interested in restaurants that accept a particular type of credit card, have a particular dress code, or provide goods within a particular price range. Accordingly, the user narrows the subsequent database search by simply selecting one or more appropriate features associated with the selected category. Multiple levels of category features can be presented based on the needs and requirements of each specific implementation of the present invention.

Another parameter that is preferably specified by the user is a search radius. For example, the user can specify that the search only include points of interest within a particular radius from the current or desired location.

It should be noted that these are just some examples of the types of parameters that can be specified by users in accordance with a preferred embodiment of the present invention. Alternate embodiments may comprise menu items that are very different from the examples provided herein. The actual contents of menu items displayed by the U/I module 1506 depend on each specific implementation of the present invention. As such, the examples used herein should not be construed to limit the scope and breadth of the present invention.

Preferably, users can also define one or more user preferences. These user preferences are used as default parameters if they are not over-ridden by current selections. In this fashion, user input is minimized.

Once the database query parameters are specified, control passes to step 1705. In step 1705, the process determines whether the location information is the Go2 grid system format. If it is not, it is converted to the Go2 grid coordinate system in step 1706. In one embodiment, this conversion takes place locally. In another embodiment, the primary server 1314 performs the conversion upon connection with the client 1404. Next, in step 1707 a data packet 1708 is created. This data packet 1708 is then stored on the local storage device 1406.

In one example, the data packet comprises the following information as depicted by block 1708. The current location, including the speed and bearing, if available. As stated, depending on the specific implementation of the present invention, this may or may not be in the Go2 grid coordinate system format. If it is not, the primary server can convert it into the Go2 coordinate grid system.

As indicated by item 4, an estimate for an intended route, based on an elapsed time may be included in the data packet. For example, a user may wish to stop for the night in one hour from the present time. In this example, an estimate of a future location may be included in the data packet. The client 1404 or the server 1314, depending on each specific implementation of the present invention, can perform the future location prediction. If the server 1314 performs the location prediction, a time period is specified in the data packet 1708.

In addition, routing information may also be specified as indicated by item 5. A routing program or the like can provide this information. If routing information is not given, a projected location is determined based on the present position, speed and bearing. Of course, if routing information is not provided, the server 1314 assumes the user will remain on the current road for the specified elapsed time. Further, the server can use additional information, such as traffic and/or weather conditions to provide more accurate predictions. This additional information can originate from anywhere on the Internet 1318 or from an Intelligent Transportation System.

As indicated by item 6, predefined user preferences are also included in the data packet 1708. This can include, for example, information such as whether the user is on a business trip or on vacation. User preferences are used to further narrow the database query. For example, if the user is looking for hotel accommodations, the program can find appropriate selections based on whether the user is on business or vacation. Preferably, the user preferences are entered one time and are not changed for every database query to minimize input requirements.

Item 7 represents preferences that override predefined user preferences for the duration of the next database query. Thus, for example, a pre-defined user preference may be to find places or interest that are within 5 miles. This user preference generally applies to every database query. However, because the user is currently driving in a rural area, the user may prefer to focus a search in a wider radius, say 20 miles. The next time the user launches a database query, if the radius is not specified, it reverts back to the 5-mile user preference value. Item 8 represents other database query parameters that may be present.

It should be noted that the above items that comprise the data packet 1708 are just a few examples of the type of data that may comprise a data packet in accordance with a preferred embodiment of the present invention. Alternate embodiments may comprise very different data items than the above examples. As such, the examples used herein should not be construed to limit the scope and breadth of the present invention.

Figure 18:
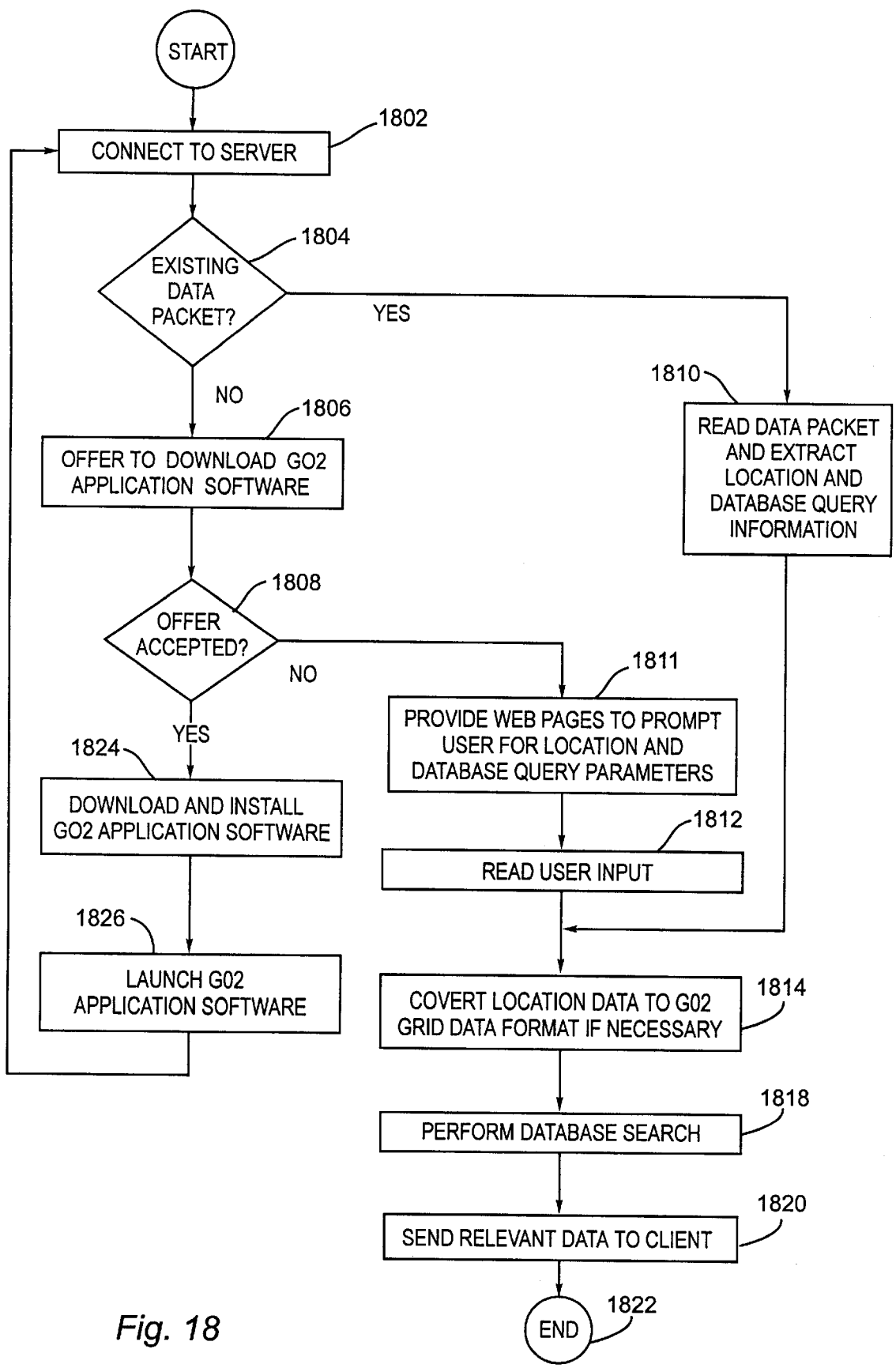
FIG. 18 is a flowchart depicting a process that can be used to implement a process performed by the primary server upon connection with the client according to an embodiment of the present invention.

FIG. 18 is a flowchart depicting a process that can be used to implement a process performed by the primary server 1314 upon connection with the client 1404. Step 1802 represents a step where the client 1404 connects with the server 1314. Next, in step 1804, the server 1314 determines if a data packet 1708 is available on the client data storage device 1408. If a data packet is available, the location information is extracted therefrom, as indicated by step 1810. Control next passes to step 1814, which is described below.

If it is determined in step 1804, that a data packet is not available, control passes to step 1806. In step 1806 the user is offered an opportunity to download the Go2 Application software 1500. Next, as indicated by step 1808, control passes to step 1824 if the user accepts the offer to download the Go2 software 1500. In step 1824, the Go2 Application software is downloaded to the client 1404.

Next, in step 1826, the Go2 Application software 1500 is executed on the client 1404. During the execution of the Go2 Application software 1500, the user inputs user preferences, location specifications and other database query parameters, as described above. After such information is entered, the Go2 Application software 1500 creates a data packet 1708 and stores it on the data storage device 1408. After this occurs, control passes back to step 1802 as described above. Now the user is enabled so that he or she can take advantage of the automated features of the present invention.

As indicated by step 1808, if it is determined that the offer to download is rejected, control passes to step 1811. In step 1811, the user is provided with one or more web pages that accept location information, user preferences and the like in a manner similar to that described above with reference to the Go2 Application U/I module 1506. In this fashion, the primary server 1314 can provide services to users that are not enabled with the Go2 Application software 1500. Next, in step 1812, the primary server 1314 reads the location information entered in step 1811. Control next passes to step 1814.

In step 1814, the location information, (either manually entered in step 1811, or automatically extracted from the data packet in step 1810), is converted to the Go2 grid coordinate system, if necessary.

Next, in step 1014, the server 1314 performs a database query. The object of the database query is to find an appropriate server 1315 that provides the type of service requested by the user. This aspect of the present invention is described in detail below, with reference to FIG. 19. The process ends as indicated by step 1822.

Figure 19:
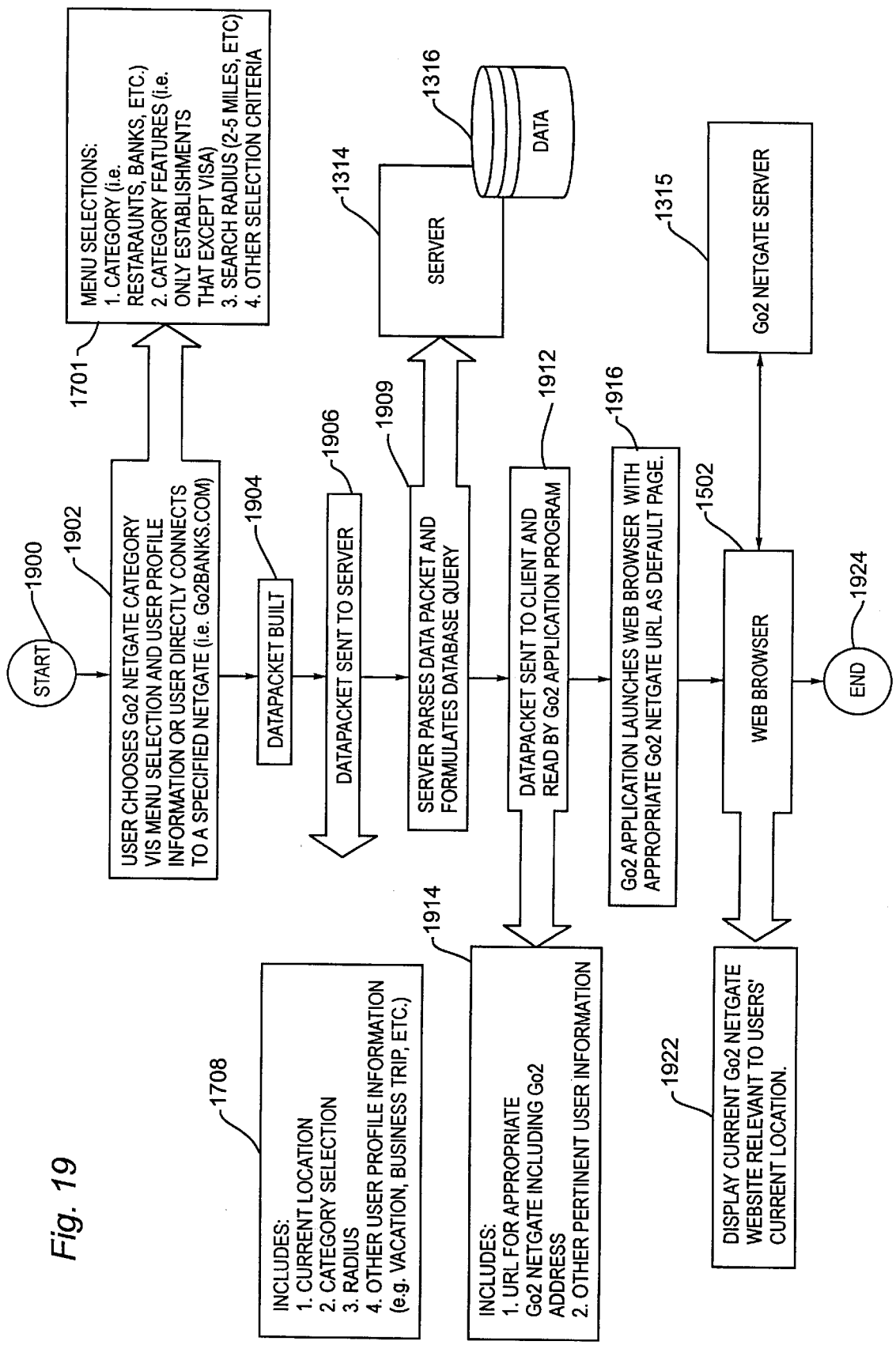
FIG. 19 is a flowchart and block diagram useful for describing the interaction and processing between the client, the primary server and an enhanced server according to an embodiment of the present invention.

FIG. 19 is a flowchart and block diagram useful for describing the interaction and processing between the client 1404, the primary server 1314 and an enhanced server 1315. The process begins with step 1102. In step 1902, the user selects a category of interest and other data from the menu 1701 the us as described above.

Next, In step 1904, the data packet module 1504 builds the data packet 1708. The data packet 1708 is then stored on the local storage device 1408. Next, as indicated by step 1906, the data packet 1708 is transmitted to the server 1314. At this point the primary server 1314 parses the data packet 1708 and formulates a database query on the database 1316.

In accordance with one embodiment of the present invention, the persistent storage device 1316 contains a list of the enhanced servers 1315 that provide location specific information in accordance with the present invention. In particular, the primary server 1314 searches its database 1316 and retrieves a specific Uniform Resource Locator ("URL") that satisfies the database search criteria entered by the user, as described above.

It should be noted that the enhanced 1315 servers are preprogrammed to provide data that is customized in accordance with a specified location. Thus, the enhanced servers are preprogrammed to accept and respond to a location identifier, preferably in the Go2 grid coordinate system.

Next, in step 1912, the client 1404 receives a second data packet 1914. The second data packet 1914 comprises the URL result from the data base query, plus any other additional information that may be required by the enhanced server 1315, as specified in the database 1316.

Next in step 1916, the Go2 Application launches the web browser component 1502 and automatically connects to the URL received in the data packet. Specifically, the browser is programmed to accept the URL as the default page so that it is automatically loaded upon connection to the Internet 1318.

It is noted that the present invention is described in terms of a primary server 1314 and a plurality of enhanced servers 1315. In this first embodiment, the primary server performs a database search that results in an address for an enhanced server that can satisfy the customer's database query. However, the present invention is not restricted to this configuration. An alternative embodiment comprises a plurality of enhanced servers but no primary server.

For example, in one embodiment, the Go2 Application software 1500 provides the services provided by the primary server 1314 in the above example. In another embodiment, the user determines which one of the enhanced servers to connect to. In this example embodiment, each of the enhanced servers 1315 is preprogrammed to parse the data packet 1708 and extract location information therefrom, as described above.

Figure 20:
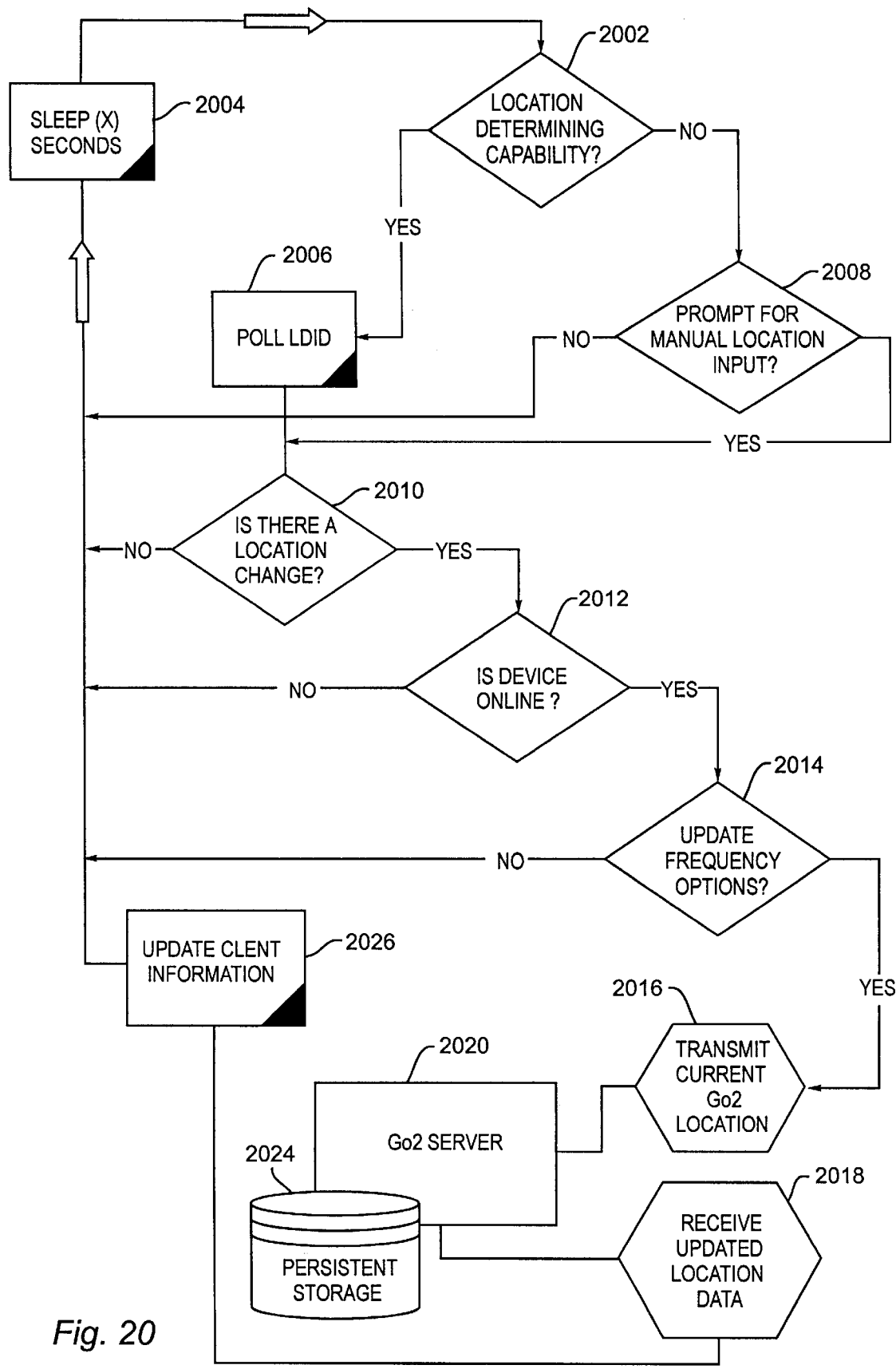
FIG. 20 is a flow chart depicting a method that can be used to implement the automatic location data collection feature according to a preferred embodiment of the present invention.

FIG. 20 is a flow chart: that is useful for describing a method that can be used in the Go2 Application program to implement a feature of the present invention for automatic location data collection. The flowchart in FIG. 20 represents an endless loop and therefore has no defined beginning or end point.

As indicated by step 2002, the process determines whether an ALI device 1406 is attached. If an ALI device 1406 is attached, control passes to step 2006. In step 2006 the ALI device 1406 is polled to retrieve location data therefrom. Next, in step 2010, the process determines whether the retrieved location data indicates a change from the previous poll. If step 2010 indicates that the location has not changed (i.e. the user is not moving), control passes to step 2004, where the process sleeps for a predetermined time period until it repeats itself in step 2002.

If step 2010 indicates that the location has changed, control passes to step 2012. In step 2012 the process determines if the client 1404 is on-line. If so, control passes to step 2014. If the client is not on-line, control passes back to step 2004.

In step 2014, the process determines if a server 1314 is currently requesting that location data be updated. The server in this example, can be any server, such as the primary server 1314 or any enhanced servers 1315. If the server is requesting updated location information, the current position, preferably in the Go2 grid format, is transmitted to the server in step 2016. If the server is not requesting an update, control passes back to step 2004.

As indicated by the blocks 2020 and 2024, the server uses the Go2 location information for performing a database query. The results are then sent back to the client and as indicated by block 2026.

An advantage of the present invention is that users can benefit from th virtually unlimited storage capacity and real-time updates of the Internet 1318. Because the Internet 1318 is used in a distributed fashion to provide users with customized location related information, the information provided to users can be as detailed as desired. For example, in addition to using maps to determine driving directions, more detailed information, such as site plans, building floor plans, photographs of the destination, private road configurations and the like can be presented to users.

Figure 21:
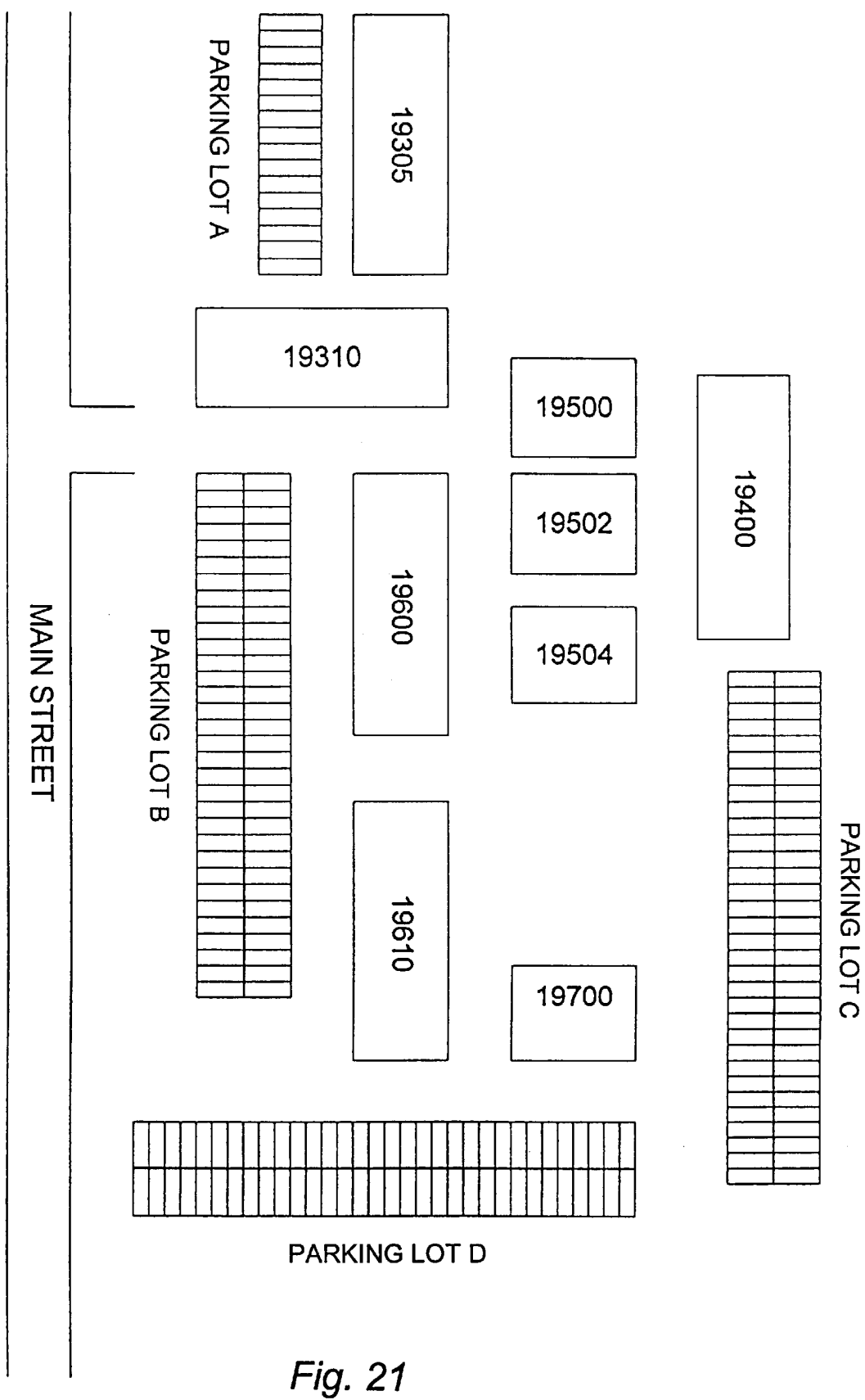
FIG. 21 depicts an example of a site plan that can be used to implement an embodiment of the present invention.

In addition, because the direction in which the user is traveling can be determined, that information can be used to select a proper orientation for the extended information, such as a site plan, for example. FIG. 21 depicts an example of a site plan that shows building configurations, parking lots, etc. In this example, the site plan in FIG. 21 is stored as digitized photograph. The orientation of the digitized photograph displayed to the user depends on the user's direction of travel so that the proper orientation is displayed.

Figure 22:
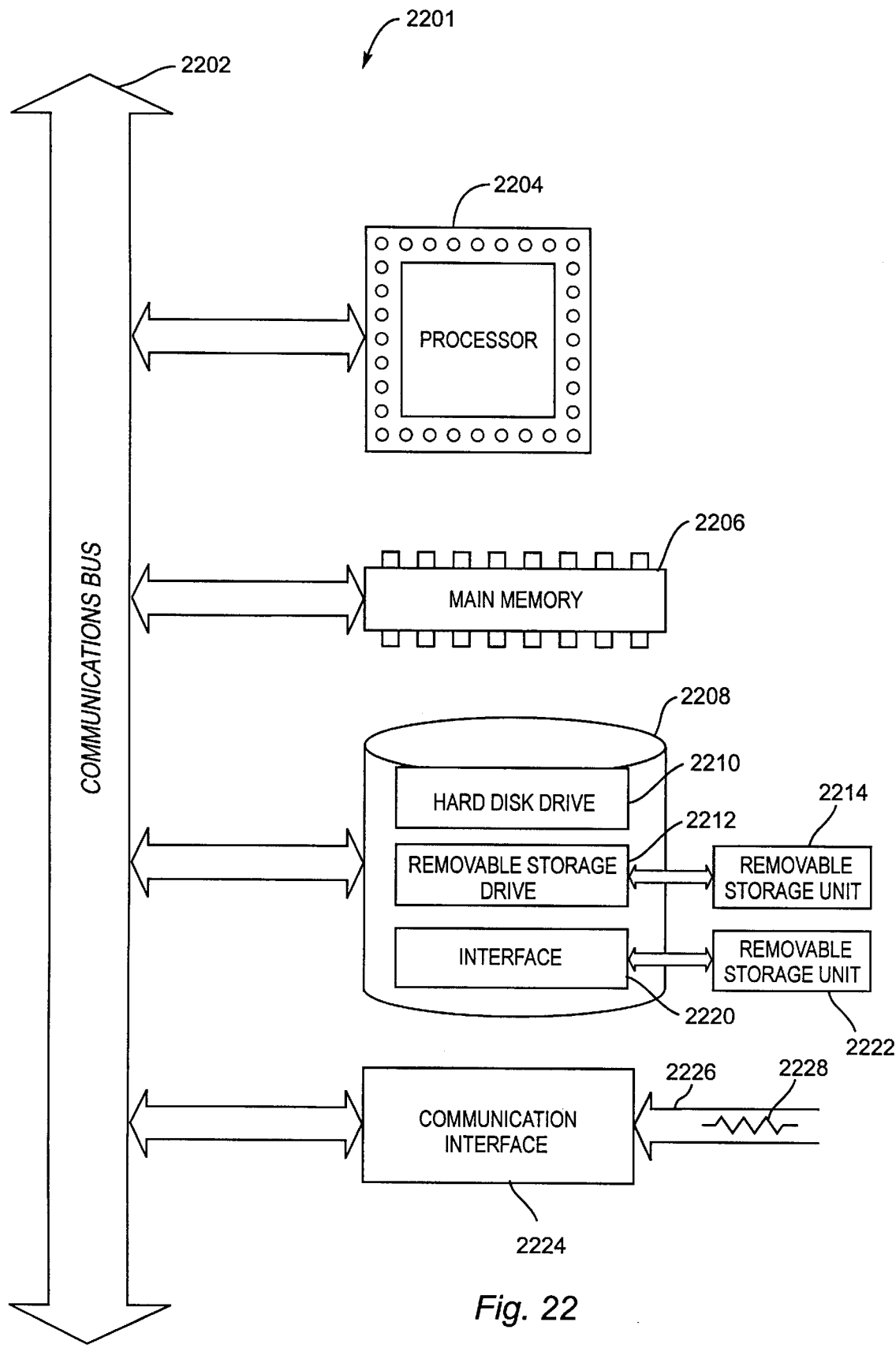
FIG. 22 is a block diagram of a computer useful for implementing components of the present invention.

The present invention may be implemented using hardware, software or a combination thereof and may be implemented in a computer system or other processing system. In fact, in one embodiment, the invention is directed toward a computer system capable of carrying out the functionality described herein. An example computer system 2201 is shown in FIG. 22. The computer system 2201 includes one or more processors, such as processor 2204. The processor 2204 is connected to a communication bus 2202. Various software embodiments are described in terms of this example computer system. After reading this description, it will become apparent to a person skilled in the relevant art how to implement the invention using other computer systems and/or computer architectures.

Computer system 2202 also includes a main memory 2206, preferably random access memory (RAM), and can also include a secondary memory 2208. The secondary memory 2208 can include, for example, a hard disk drive 2210 and/or a removable storage drive 1012, representing a floppy disk drive, a magnetic tape drive, an optical disk drive, etc. The removable storage drive 2212 reads from and/or writes to a removable storage unit 2214 in a well-known manner. Removable storage unit 2214, represents a floppy disk, magnetic tape, optical disk, etc. which is read by and written to by removable storage drive 2212. As will be appreciated, the removable storage unit 2214 includes a computer usable storage medium having stored therein computer software and/or data.

In alternative embodiments, secondary memory 2208 may include other similar means for allowing computer programs or other instructions to be loaded into computer system 2201. Such means can include, for example, a removable storage unit 2222 and an interface 2220. Examples of such can include a program cartridge and cartridge interface (such as that found in video game devices), a removable memory chip (such as an EPROM, or PROM) and associated socket, and other removable storage units 2222 and interfaces 2220 which allow software and data to be transferred from the removable storage unit 2222 to computer system 2201.

Computer system 2201 can also include a communications interface 2224. Communications interface 2224 allows software and data to be transferred between computer system 2201 and external devices. Examples of communications interface 2224 can include a modem, a network interface (such as an Ethernet card), a communications port, a PCMCIA slot and card, etc. Software and data transferred via communications interface 2224 are in the form of signals which can be electronic, electromagnetic, optical or other signals capable of being received by communications interface 2224. These signals 2226 are provided to communications interface via a channel 2228. This channel 2228 carries signals 2226 and can be implemented using wire or cable, fiber optics, a phone line, a cellular phone link, an RF link and other communications channels.

In this document, the terms "computer program medium" and "computer usable medium" are used to generally refer to media such as removable storage device 2212, a hard disk installed in hard disk drive 2210, and signals 2226. These computer program products are means for providing software to computer system 2201.

Computer programs (also called computer control logic) are stored in main memory and/or secondary memory 2208. Computer programs can also be received via communications interface 2224. Such computer programs, when executed, enable the computer system 2201 to perform the features of the present invention as discussed herein. In particular, the computer programs, when executed, enable the processor 2204 to perform the features of the present invention. Accordingly, such computer programs represent controllers of the computer system 2201.

In an embodiment where the invention is implemented using software, the software may be stored in a computer program product and loaded into computer system 2201 using removable storage drive 2212, hard drive 2210 or communications interface 2224. The control logic (software), when executed by the processor 2204, causes the processor 2204 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While embodiments and applications of this invention have been shown and described, it would be apparent to those in the Field that many more modifications are possible without departing from the inventive concepts herein. The invention, therefore, is not to be restricted except in the spirit of the appended claims.

What is claimed is:

1. A method of using a grid address as a geographical location identifier, comprising:

providing a hierarchical grid address including a specific locational address appended to general position information, the general position information representing at least one of a plurality of pre-defined grids, each of the grids corresponding to a geographical area and having a plurality of cells and sub-cells corresponding to smaller geographical areas within the grid, the specific locational address includes a predefined alpha code representing a specific object associated with said hierarchical grid address to further identify a specific characteristic of said hierarchical grid address; and using the hierarchical grid address as a geographic location identifier.

2. The method of claim 1, wherein the predefined alpha code represents a specific object in a third dimension.

3. The method of claim 2, wherein the third dimension relates to a vertical or height dimension.

4. The method of claim 1, wherein the predefined alpha code includes one or more of the following said specific characteristics:

aisle, apartment, address, box, bin, bay, column, case, door, depth, day, elevator, entry, elevation, escalator, floor, field, garage, gate, height above ellipsoid, height above geoid, height orthometric, height above sea level, height above topographical surface, house, locker, level, number, P.O. box, phone, room, row, road, street, suite, security code, section, seat, time, tram, train, track, unit, intersection and zip code.

5. The method of claim 1, wherein the specific locational address includes a plurality of hierarchical codes representative of a specific cell, sub-cell, and any further levels of cell subdivision.

6. The method of claim 1, wherein each of the grids corresponds to a geographical area and has:
   a plurality of cells;
   a reference location;
   global coordinates of said reference location; and
   at least one parameter defining(, cell size and orientation.

7. The method of claim 1, wherein the specific locational address is a proprietary name.

8. The method of claim 1, wherein the general position information includes top, second, and third level hierarchical codes for identifying countries, states/provinces, and cities.

9. The method of claim 1, wherein the general position information includes a country code as a top level hierarchical code.

10. The method of claim 9, wherein the country code is a two alpha character mnemonic.

11. The method of claim 1, wherein the general position information includes a state/province code as a second level hierarchical code.

12. The method of claim 11, wherein the state/province code is a two alpha character mnemonic.

13. The method of claim 1, wherein the general position information includes a city code as a third level hierarchical code.

14. The method of claim 13, wherein the city code is a two or three alpha character mnemonic.

15. A method of using a grid address as a geographical location identifier, comprising:
   providing a hierarchical grid address including at least a top level code, a second level code, a third level code, and a predefined alpha code, the top level code representing a country, the second level code representing a state/province, the third level code representing a city, and the predefined alpha code representing a specific object associated with said hierarchical grid address to further identify a specific characteristic of said hierarchical grid address; and
   using the hierarchical grid address as a geographic location identifier.

16. The method of claim 15, wherein the predefined alpha code represents a specific object in a third dimension.

17. The method of claim 16, wherein the third dimension relates to a vertical or height dimension.

18. The method of claim 15, wherein the predefined alpha code includes one or more of the following said specific characteristics:
   aisle, apartment, address, box, bin, bay, column, case, door, depth, day, elevator, entry, elevation, escalator, floor, field, garage, gate, height above ellipsoid, height above geoid, height orthometric, height above sea level, height above topographical surface, house, locker, level, number, P.O. box, phone, room, row, road, street, suite, security code, section, seat, time, tram, train, track, unit, intersection and zip code.

19. The method of claim 15, wherein the country code is a two alpha character mnemonic.

20. The method of claim 15, wherein the state/province code is a two alpha character mnemonic.

21. The method of claim 15, wherein the city code is a two or three alpha character mnemonic.

22. The method of claim 15, wherein the hierarchical grid address includes a fourth level code representing a proprietary name.

23. The method of claim 22, wherein the proprietary name includes at least one of alpha and numeric characters.

24. The method of claim 15, wherein the hierarchical grid address further includes a plurality of hierarchical codes representative of a specific cell, sub-cell, and any further levels of cell subdivision of a grid.

25. The method of claim 15, wherein the hierarchical grid address includes general position information representing at least one of a plurality of pre-defined grids, each grid corresponds to a geographical area and has:
   a plurality of cells;
   a reference location;
   global coordinates of said reference location; and
   at least one parameter defining cell size and orientation.

26. A method of using a grid address as a geographical location identifier, comprising:
   providing a hierarchical grid address including a predefined alpha code representing a specific object associated with said hierarchical arid address to further identify a specific characteristic of said hierarchical grid address; and
   using the hierarchical grid address as a geographic location identifier.

27. The method of claim 26, wherein the predefined alpha code represents a specific object in a third dimension.

28. The method of claim 27, wherein the third dimension relates to a vertical or height dimension.

29. The method of claim 26, wherein the predefined alpha code includes one or more of the following said specific characteristics:
   aisle, apartment, address, box, bin, bay, column, case, door, depth, day, elevator, entry, elevation, escalator, floor, field, garage, gate, height above ellipsoid, height above geoid, height orthometric, height above sea level, height above topographical surface, house, locker, level, number, P.O. box, phone, room, row, road, street, suite, security code, section, seat, time, tram, train, track, unit, intersection and zip code.

* * * * *